US008694364B2

(12) United States Patent
Hammond et al.

(10) Patent No.: US 8,694,364 B2
(45) Date of Patent: Apr. 8, 2014

(54) RETURN COUPON HOLDER

(75) Inventors: Mark S. Hammond, Laguna Beach, CA (US); Peter L. Bradshaw, San Clemente, CA (US); Jim Ibert, San Clemente, CA (US); Dave Justus, Coto De Caza, CA (US); Mark R. Hilinski, Claremont, CA (US); David B. Speights, Tustin, CA (US)

(73) Assignee: The Retail Equation, Inc., Irvine, CA (US)

( * ) Notice: Subject to any disclaimer, the term of this patent is extended or adjusted under 35 U.S.C. 154(b) by 453 days.

(21) Appl. No.: 11/844,286

(22) Filed: Aug. 23, 2007

(65) Prior Publication Data
US 2008/0065485 A1 Mar. 13, 2008

Related U.S. Application Data

(60) Provisional application No. 60/839,660, filed on Aug. 23, 2006.

(51) Int. Cl.
*G06Q 30/00* (2012.01)
(52) U.S. Cl.
USPC .......................................... 705/14.1
(58) Field of Classification Search
USPC ................................... 705/14, 14.1
See application file for complete search history.

(56) References Cited

U.S. PATENT DOCUMENTS

| | | | |
|---|---|---|---|
| 5,687,322 | A | 11/1997 | Deaton et al. |
| 5,832,458 | A | 11/1998 | Jones |
| 6,016,480 | A | 1/2000 | Houvener et al. |
| 6,536,659 | B1 | 3/2003 | Hauser et al. |
| 6,834,268 | B2 | 12/2004 | Junger |
| 6,975,205 | B1 | 12/2005 | French et al. |
| 7,076,449 | B2 | 7/2006 | Tsunenari et al. |

(Continued)

FOREIGN PATENT DOCUMENTS

| | | |
|---|---|---|
| CN | 1416084 | 5/2003 |
| CN | 1416084 A | 5/2003 |
| WO | WO 2005029284 | 3/2005 |

OTHER PUBLICATIONS

Su, et al., "A Manufacturer's Optimal Quatity Discount Strategy and Return Policy Through Game-Theoretic Approach," Journal of the Operational Research Society, Aug. 2002, vol. 53, No. 8, UK.

(Continued)

*Primary Examiner* — Daniel Lastra
(74) *Attorney, Agent, or Firm* — Knobbe, Martens, Olson & Bear, LLP

(57) ABSTRACT

A return coupon holder is described for holding a return coupon issued in a store in conjunction with a customer's merchandise return transaction. The return coupon holder is preferably sized large enough to discourage the customer from stowing the coupon away, such as in a handbag. Additionally, holders may be of different types that visually or electronically convey information about a category associated with the customer's return transaction. Thus, salespersons may accordingly provide appropriate customer service to the customer. The holder categories may indicate an approximate dollar value of the return transaction, a type of merchandise returned, a return payment method, an assessment of the profitability of the customer, an assessment of the risk of fraud associated with the return transaction, and the like. A computer decision system may select holder type. Some embodiments of the coupon holder are fitted with a device that allow tracing of the customer's movements while still in the store.

14 Claims, 16 Drawing Sheets

(56) References Cited

U.S. PATENT DOCUMENTS

| | | | |
|---|---|---|---|
| 7,149,530 | B1 | 12/2006 | Arakawa et al. |
| 7,455,226 | B1 | 11/2008 | Hammond et al. |
| 7,455,526 | B1 | 11/2008 | Hammond et al. |
| 8,025,229 | B2 | 9/2011 | Hammond et al. |
| 2001/0037207 | A1 | 11/2001 | Dejaeger |
| 2001/0041988 | A1 | 11/2001 | Lin |
| 2002/0010629 | A1 | 1/2002 | Diamond |
| 2002/0052818 | A1 | 5/2002 | Loveland |
| 2002/0072956 | A1 | 6/2002 | Willems et al. |
| 2002/0161641 | A1 | 10/2002 | Quinlan et al. |
| 2003/0004798 | A1* | 1/2003 | McAuliffe et al. ............ 705/14 |
| 2003/0023482 | A1 | 1/2003 | Messner et al. |
| 2003/0233278 | A1 | 12/2003 | Marshall |
| 2004/0039679 | A1* | 2/2004 | Norton et al. ................... 705/37 |
| 2004/0069661 | A1* | 4/2004 | Telleen ........................ 206/232 |
| 2004/0128265 | A1 | 7/2004 | Holtz et al. |
| 2004/0172260 | A1 | 9/2004 | Junger et al. |
| 2004/0260608 | A1 | 12/2004 | Lewis et al. |
| 2005/0071228 | A1* | 3/2005 | Bortolin et al. ................ 705/14 |
| 2005/0131761 | A1 | 6/2005 | Trika et al. |
| 2005/0222904 | A1 | 10/2005 | Cotton et al. |
| 2005/0234771 | A1 | 10/2005 | Register et al. |
| 2005/0278215 | A1 | 12/2005 | Seele, Jr. |
| 2006/0149577 | A1 | 7/2006 | Stashluk, Jr. et al. |
| 2006/0155603 | A1 | 7/2006 | Abendroth et al. |
| 2006/0235746 | A1 | 10/2006 | Hammond et al. |
| 2006/0235747 | A1 | 10/2006 | Hammond et al. |
| 2006/0242011 | A1 | 10/2006 | Bell et al. |
| 2006/0253453 | A1 | 11/2006 | Chmaytelli et al. |
| 2006/0259262 | A1 | 11/2006 | Kuehnrich |
| 2008/0065485 | A1 | 3/2008 | Hammond et al. |
| 2008/0249658 | A1* | 10/2008 | Walker et al. ................. 700/236 |
| 2009/0076870 | A1 | 3/2009 | Hammond et al. |
| 2011/0087606 | A1 | 4/2011 | Hammond et al. |

OTHER PUBLICATIONS

Laura Heller, "High Cost of Returns Prompts Industry Cooperation," Discount Store News, Oct. 5, 1998, vol. 37, Issue 19, p. 4.

Jim Milliot, "Returning to the Returns Question", Publishers Weekly, Jun. 22, 1998, vol. 245, Issue 25; p. 48, New York.

"Capturing the Power of the POS," Chain Store Age. Jun. 2000, vol. 76, Issue 6, p. 4A, New York.

Chapter 2: Managing Returns, available online at http://www.planitrol.com/web/ Gatekeeping_with_Returns_Management.pdf, retrieved on Dec. 13, 2006.

International Search Report for International Application No. PCT/US06/13431.

International Search Report for International Application No. PCT/US07/076693.

International Preliminary Report on Patentability for International Application No. PCT/US06/13431.

International Preliminary Report on Patentability for International Application No. PCT/US07/076693.

Anonymous, www.thereturnexchange.com (Internet archive documents), 2000-2001.

Screenshots of TheReturnExchange.com, dated Apr. 18, 2004 and prior taken from Archive.org.

U.S. Appl. No. 11/264,469, filed Nov. 1, 2005, Hammond, et al.

U.S. Appl. No. 11/264,419, filed Nov. 1, 2005, Hammond, Mark et al.

U.S. Appl. No. 13/244,058, filed Sep. 23, 2011, Hammond, Mark et al.

* cited by examiner

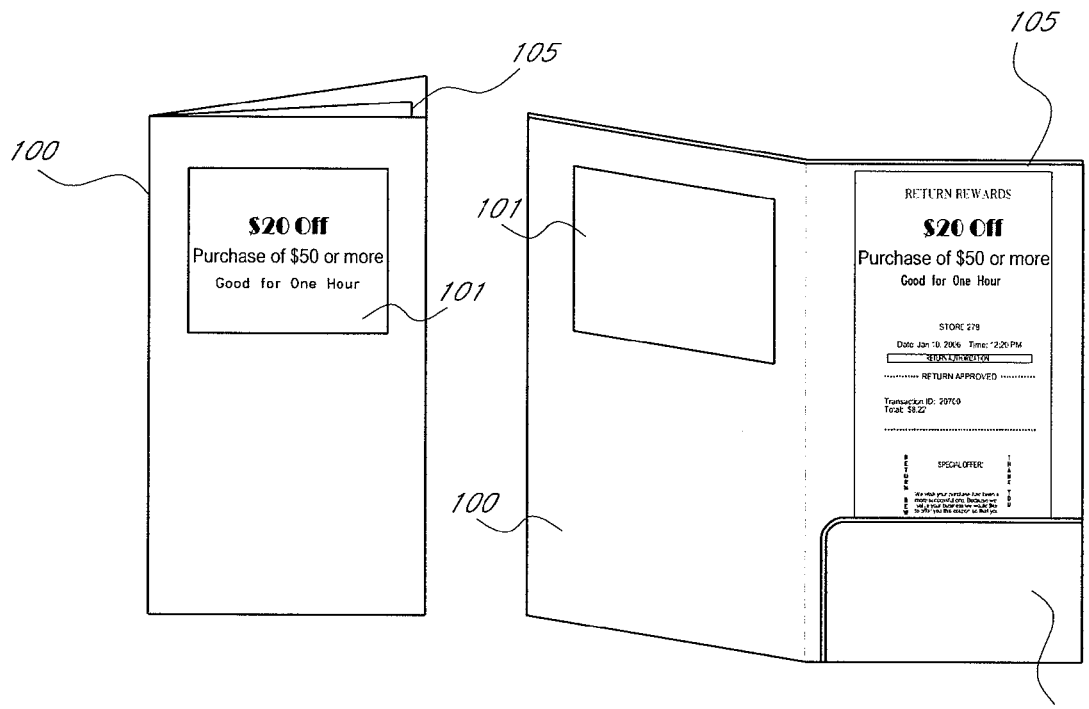
FIG. 1A  FIG. 1B
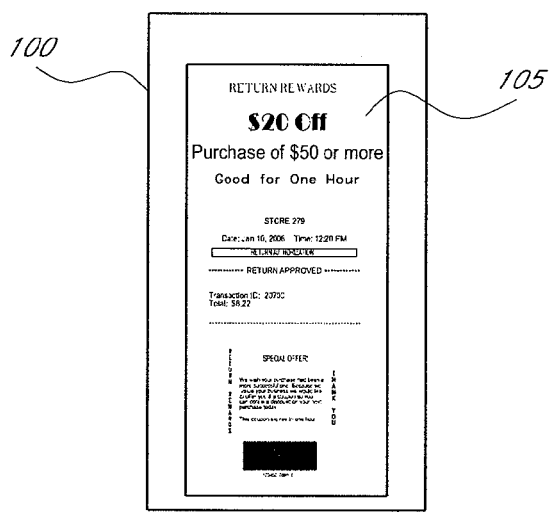
FIG. 1C

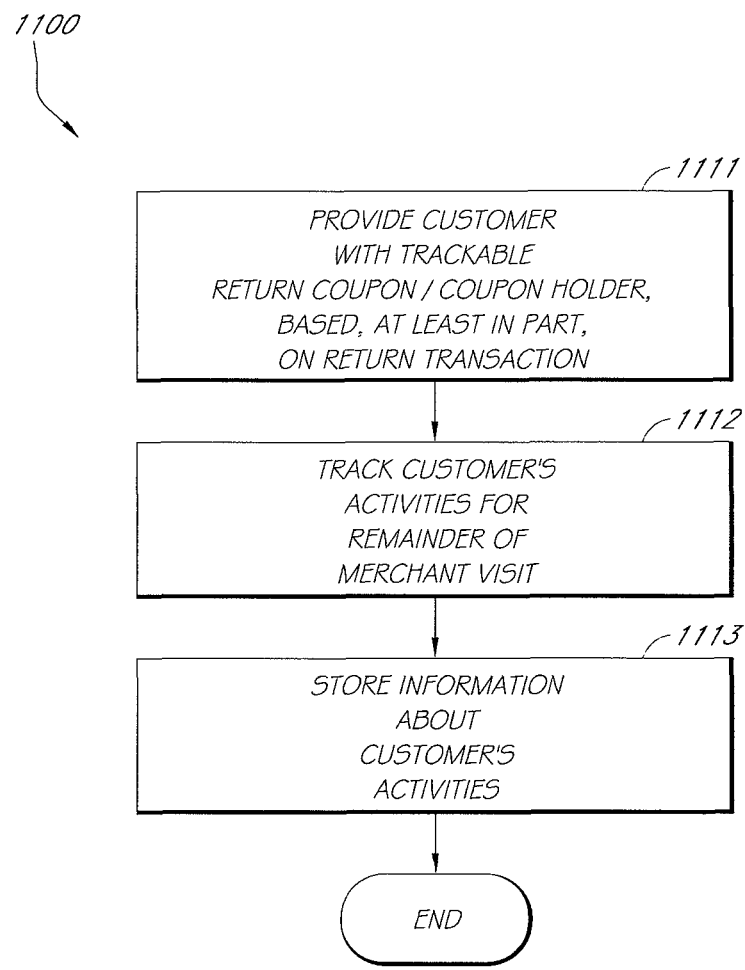

RETURN COUPON HOLDER

PRIORITY CLAIM

This application claims the benefit of priority under 35 U.S.C. §119(e) of U.S. Provisional Application No. 60/839,660, filed on Aug. 23, 2006 and titled SYSTEMS AND METHODS RELATED TO A SLEEVE FOR A RETAIL COUPON, the entirety of which is incorporated herein by reference.

FIELD OF THE INVENTION

The invention relates to offering rewards at a point of return.

BACKGROUND OF THE INVENTION

Many retail merchants have found that customers appreciate shopping at a store with a liberal merchandise return acceptance policy. However, implementing a liberal return acceptance policy may significantly decrease the store's profitability when existing sales are rescinded and returned merchandise may need to be re-sold at a discount, if it is sold again at all. Merchants would therefore like to provide the desired liberal return acceptance policy while reducing loss of sales.

One strategy for the attainment of this goal is to provide a coupon to a customer making a return, thereby encouraging the customer to make a subsequent purchase. Such return coupons may be especially effective if they have only a very short period of validity, such as only one hour or only one day, so that the customer may be encouraged to make the subsequent purchase while still in the merchant's store.

Unfortunately, customers who receive such return-related coupons often put them into their pocket or purse, and may even forget about them. Furthermore, even if customer holds the coupon, it is typically not readily discernible from a distance by the store sales personnel who may see the customer passing by on the way out of the store. Thus, the sales personnel may not realize that the customer may be more easily persuaded than normal to make a purchase and may miss an opportunity to make a sale that might counterbalance the earlier return transaction. Even if the sales personnel do detect the coupon, the coupon typically does not convey any information about the recent return transaction or about the customer, which may prove relevant to the potential purchase.

In addition, the merchant typically has no way to track the customer's movements or activities while in the store or to see what was the effect, if any, of receiving the return coupon on the customer's movements or activities.

SUMMARY OF THE INVENTION

A return coupon holder is described for holding a return coupon issued in a store in conjunction with a customer's merchandise return transaction. The coupon holder is preferably sized large enough to discourage the customer from stowing the coupon away, such as in a pocket or handbag. Additionally, return coupon holders may be of different types that visually convey information about a category associated with the customer's return transaction. Thus, salespersons may readily perceive the presence and category of the return coupon holder and may accordingly provide appropriate customer service to the customer. The holder categories may indicate, for example, an approximate dollar value range for the return transaction, a general type of merchandise returned, a return payment method, an assessment of the profitability of the customer overall, an assessment of the risk of fraud associated with the return transaction, and the like. A computer decision system may select the return coupon holder type and may instruct a returns clerk accordingly. Some embodiments of the coupon holder are fitted with an RFID or other trackable device that allow tracing of the customer's movements while still in the store.

Embodiments of a computerized system for providing a return coupon and a return coupon holder to a customer making a merchandise return at a merchant's store are described. The system includes a plurality of return coupon holders, where each return coupon holder is configured to hold a return coupon associated with a merchandise return transaction made by a customer at a merchant's store. The combination of the return coupon holder and the return coupon provide information about the merchandise return. The system further includes a processor that is configured to receive information about the merchandise return, which includes one or more items that the customer desires to return to the merchant. The system also includes a database that includes return history data that includes information about prior merchandise returns. Additionally, the system includes a return coupon holder decision engine that is in communication with the processor and with the database. The return coupon decision engine is configured to receive the information about the merchandise return by the customer and the return history data and to select, from the plurality of return coupon holders, the return coupon holder for holding the return coupon issued to the customer at the point of return in connection with the merchandise return. The selection is based at least in part on the information about the merchandise return and based at least in part on the return history data.

Embodiments of a return coupon holder are described. The return coupon holder is configured to hold a return coupon issued to a customer in connection with a merchandise return transaction at a point of return in a merchant's store. The return coupon holder is further configured to convey information about the merchandise return to a representative of the merchant.

Embodiments of a method of conveying information to representatives of a merchant about a customer who has made a merchandise return are described. The method includes receiving a request for a merchandise return transaction from a customer at a point of return in a merchant's store. The method further includes transmitting information about the requested merchandise return transaction to a return authorization service. Additionally, the method includes receiving from the return authorization service an indication of a return coupon holder type to offer to the customer for holding a return coupon issued to the customer and providing to the customer a return coupon holder of the indicated coupon holder type for holding the return coupon, such that the return coupon holder and the return coupon provide information about the merchandise return transaction to the representatives of the merchant.

Embodiments of a system for conveying information about a customer who has made a merchandise return to representatives of a merchant are described. The system includes means for receiving a request for a merchandise return transaction from a customer at a point of return in a merchant's store. The system further includes means for transmitting information about the requested merchandise return transaction to a return authorization service. Additionally, the system includes means for receiving from the return authorization service an indication of a return coupon holder type, selected from amongst a plurality of return coupon holder types, to offer to the customer for holding a return coupon issued to the customer and means for providing the return coupon holder and the return coupon to the customer, such that the return coupon holder and the return coupon provide information about the merchandise return transaction.

Embodiments of a method of conveying, to one or more representatives of a merchant, information about a merchandise return made by a customer are described. The method includes: receiving a request for a merchandise return transaction from a customer at a point of return in a merchant's store, transmitting information about the requested merchandise return transaction to a return authorization service, receiving from the return authorization service an indication of a return coupon holder type, selected from amongst a plurality of return coupon holder types, to offer to the customer for holding a return coupon issued to the customer, and providing the return coupon holder and the return coupon to the customer, such that the return coupon holder and the return coupon provide information about the merchandise return transaction.

For purposes of summarizing embodiments of the invention, certain aspects, advantages, and novel features of the invention have been described herein. It is to be understood that not necessarily all such aspects, advantages, or novel features will be embodied in any particular embodiment of the invention.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIGS. 1A and 1B depict one embodiment of a return coupon holder for holding a return coupon that may be issued at a point of return.

FIG. 1C depicts an alternative embodiment of a return coupon holder for holding a return coupon that may be issued at a point of return.

FIG. 11 is a flowchart that illustrates one embodiment of a process for issuing and using a trackable return coupon holder.

DETAILED DESCRIPTION OF EMBODIMENTS

Figure 1D:
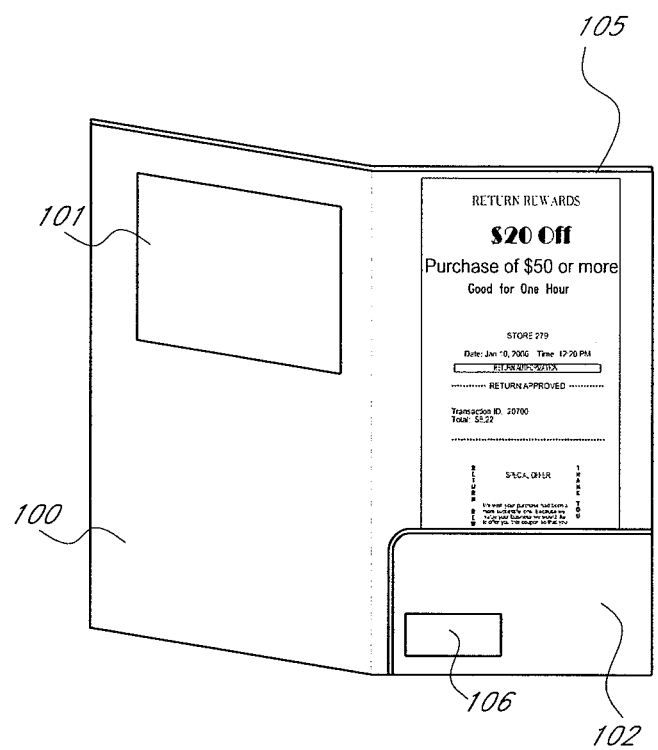
FIG. 1D depicts an embodiment of a return coupon holder that includes an RFID device.

Embodiments of systems and methods are described that provide holders for return coupons issued to customers who are requesting to return merchandise at a point of return at a merchant establishment. As an example, a return coupon holder may be used for holding a return coupon that is issued in conjunction with a customer's merchandise return transaction and that has a short period of validity, such as one or two hours, in order to encourage the customer to make another purchase while still in the store. In various embodiments, the return coupon holder provides information to store personnel as is described in greater detail with reference to the figures to follow.

In various embodiments, the return coupon holder may enhance the appearance of the return coupon, for example to give it a look and feel similar to that of a gift card, in order to provide a positive attitude towards the return coupon on the part of the customer. The return coupon holder may also convey a positive image to other customers, such as when the return coupon holder conveys an image of prestige, trendiness, exclusivity, and the like. In various embodiments, the sleeve may include, for example, one or more of: decorative designs, including one or more logos or other graphical design elements, including color, shape, material, reflectivity, bulk, size, paper type, various graphic, typographic, textual, and/or non-textual symbols, and Stock Keeping Unit code (SKU) of an item that was returned. The design elements may serve aesthetic purposes and/or may be used to convey information.

FIGS. 1A and 1B depict one embodiment of a return coupon holder 100 for holding a return coupon 105 that may be issued at a point of return, such as at a merchant's store. A more detailed description of some embodiments of the return coupon 105 is provided with reference to FIGS. 5A and 5B to follow.

The return coupon holder 100 of FIGS. 1A and 1B is configured as a sleeve or folder into which the return coupon 105 may be inserted. A flap 102 may be included to provide a shelf upon which the return coupon 105 may rest. The flap 102 may thus help keep the return coupon 105 from slipping out from the return coupon holder 100. A window 101 in the return coupon holder 100 allows a portion of the return coupon 105 to be viewed, even when the return coupon 105 is enclosed with the return coupon holder 100. In some embodiments, the window 101 is an uncovered opening in the return coupon holder 100. In other embodiments, the window 101 may be covered, such as with a transparent or translucent plastic or other material.

In various embodiments, the customer making a merchandise return is categorized into one of at least two categories, based at least in part on information related to the merchandise being returned, and the return coupon holder 100 includes one or more types of indicia that indicate the category. For example, return coupon holders 100 of different colors and/or different sizes and/or different shapes and/or different materials may indicate different categories into which the customers making the return transactions may be categorized. Additionally or alternatively, various insignia, designs, or text on at least an exterior portion of the return coupon holder 100 may indicate different categories.

As an example, the categories may be based, at least in part, on one or more of the following: the amount of the return; whether the return was given as a credit to an account, as a store credit, or in cash; what type(s) of items were returned; information about the customer's past return history; and information about the customer's past purchase history.

The sleeve may be selected by a clerk or other employee or store representative who is offering the coupon and/or may be selected by a computer system with access to information about the customer. For example, in some embodiments, the selection of a coupon sleeve for providing to a customer may be based at least in part on a computer system that includes one or more models for selecting a coupon sleeve and that may have access to stored consumer information for use with the one or more models.

In some embodiments, the indicia indicating the return customer category is preferably readily identifiable and visible from a distance, such as by store personnel, when the customer is holding the return coupon holder 100. Accordingly, in some preferred embodiments, the return coupon holder 100 is sufficiently large that a customer receiving the return coupon 105 in the return coupon holder 100 will be encouraged to hold the return coupon holder 100 by hand, instead of placing it within a pocket or handbag.

Thus, a store clerk or other representative of the merchant who has been trained regarding the use of the return coupon holders 100 may be able to readily perceive and differentiate, for example, between a customer who has just received a cash return of over $100 and a customer whose $10 return amount has just been credited to a credit or debit card account. The merchant representative may be able to perceive from the return coupon holder that the customer has received a 70% discount based on the merchandise return as opposed to a 15% discount. As a further example, the clerk may be able to readily perceive from the coupon holder 100 that the customer is a very good customer of the store, perhaps designated as a "VIP" who has just made a very large return. In another example, the clerk may be able to perceive that their return included mostly items from the sporting goods department and/or that the customer has just made their very first return at the store, such as when the customer is return a gift purchased by someone else. The return coupon holder may include indicia of one or more SKU codes associated with the returned items. In addition, in recognizing that the customer has a return coupon holder 100, the clerk knows that the customer was recently involved in a return transaction. Additionally or alternatively, the return coupon holder 100 may indicate one or more brands of merchandise for which the coupon may be used. In other embodiments, the return coupon holder may indicate other types of information, such as whether the customer is categorized as a "good" customer of the merchant's store, a known level of profitability associated with the customer, a number of years that the customer has been a patron to the merchant's store, an indication of what the customer may be likely to buy, based, at least in part, on past purchase history.

Once in possession of this information, the clerk may adjust his or her response to the customer accordingly, such as: choosing to spend more or less time with the customer, to direct the customer towards items that may be of interest to the customer and/or to items whose cost is approximately the same as the return amount, and/or asking the customer about the merchandise return in order to improve the customer's experience of the merchant's store.

In various embodiments, the definition and number of categories may be customized to suit the preferences of the merchant. Additionally, in some embodiments, the return coupon holder may include information for the customer that allows the customer to receive a special online offer, such as a discount for an online purchase.

FIG. 1C depicts an alternative embodiment of a return coupon holder 100 for holding a return coupon 105 that may be issued at a point of return. In FIG. 1C, the return coupon holder 100 is generally a flat substrate, such as a piece of cardboard, plastic, or other material or combination of materials that provides a rigid or semi-rigid backing for the return coupon 105. In one embodiment, the return coupon 105 is attached to the return coupon holder 100 with an adhesive that attaches all or a top portion or other portion of the return coupon 105 to the return coupon holder 100. Additionally or alternatively, slits (not shown) cut into the return coupon holder 100 may allow one or more corners of the return coupon 105 to be inserted into the slit, thereby securing the return coupon 105 to the return coupon holder 100.

In some embodiments, indicia of the customer's assigned category is on return coupon 105, and when the return coupon 105 is held by the return coupon holder 100, the combination of the return coupon holder 100 and the return coupon 105 provides visually discernible information to the store clerk or other personnel, such as about a category to which the customer is assigned with respect to the current return transaction. For example, some or all of the return coupon 105 may be printed in a color that indicates the customer's category. Additionally or alternatively, a graphic design or other printable indicia may be included on the return coupon 105. For the embodiment depicted in FIGS. 1A and 1B, category indicia printed on the return coupon 102 is preferably printed on a portion of the return coupon 105 that is viewable through the window 101 of the coupon holder 100 when the coupon holder 100 is folded over and encloses the return coupon 105.

FIG. 1D depicts an embodiment of the return coupon holder 100 that includes a device 106 for providing additional information about the customer's activities for use by the merchant or personnel or associates of the merchant. For example, the device 106 may be an electronic device, such as an RFID device, an electromagnetic device, a global positioning system (GPS) device, or other device that allows the customer's location, such as within the store, to be tracked subsequent to the return transaction.

In some embodiments, the device 106 may be attached to a flap 102 or other inner portion of the return coupon holder 100. In some embodiments, the device 106 may be attached to an outer portion of the return coupon holder 100. In some embodiments, the electronic device 106 may be embedded in the material of the return coupon holder 100. In some embodiments, the device 106 may be attached to the return coupon 105.

The electronic device 106 may communicate with other sensors or other types of devices located, for example, throughout the store, and may, in various embodiments, provide a variety of types of information that may be used in a variety of ways. For example, the electronic device 106 may cause an indication to be provided to a sales clerk, alerting the sales clerk that a customer who recently made a return transaction is nearby. Additionally or alternatively, the electronic device 106 may communicate any of the other types of information communicated by the return coupon holders 100 described with reference to FIGS. 1A-1C. Additionally or alternatively, the RFID device 106 may allow information to be collected and stored about specific areas of the store, such as specific merchandise racks, that the customer visited subsequent to the return transactions, including, in some embodiments, how long was spent at each location, what merchandise seemed of most interest to the customer, whether the customer looked more at sale and clearance items or at new arrivals, and the like.

In some embodiments, the device 106 triggers one or more audio and/or video recordings to be played at appropriate locations in the store when the customer is within a given proximity to an item determined to be of potential interest to the customer, such as, for example, because of similarity of type to the returned merchandise, because of similarity of price to the returned item, or the like.

Some embodiments of the return coupon holder 100, especially embodiments made of paper, cardboard, plastic or other inexpensive material, may be disposable. For example, customers may be allowed to take these holders 100 out of the store, if desired. Some embodiments of the return coupon holder 100 may be made of a more expensive material, such as leather, wood, fabric, or metal, and/or may include one or more electronic or other devices 106 that the merchant may prefer to have stay within the store, possibly for reuse with another return coupon 105. Some embodiments of such reusable coupon holders 100 may include a sensor (not shown) that triggers an alert when the coupon holder 100 is being removed from store premises.

In addition, while several variations of the return coupon holder 100 have been shown and described in detail, including embodiments that provide non-textual information, such as graphic and/or electronic information, other modifications, which are within the scope of these inventions, will be readily apparent to those of skill in the art based upon this disclosure.

For example, in some embodiments, the return coupon holder 100 includes identifying indicia, such as a barcode or identification number. Information about the identifying indicia may be scanned or otherwise collected by the merchant during redemption of the return coupon 105 at a point of sale. The information thus collected may be used by the merchant, or by another interested entity, to analyze a level of effectiveness associated with different types of return coupon holder 100 and/or to perform any of a variety of other measurements, tracking operations and/or analyses related to return coupons 105 and/or return coupon holders 100.

As another example, the return coupon holders 100 may be customized in appearance to suit the preferences of the merchant. In some embodiments, the return coupon holders 100 may be customized seasonally, such as for various holidays. The seasonal return coupon holders 100 may additionally or alternatively be associated with special conditions that apply to return coupons 105 issued during a given time period. For example, a merchant may wish to extend the normal period of validity of the return coupons 105 that are issued in a holiday season, in order to encourage customers to come back to the store for another shopping trip during the holiday season. A return coupon holder 100 that is specially decorated, for example, for the holiday season may convey information to sales personnel about the extended term of validity of the enclosed return coupon 105.

Furthermore, although embodiments of the return coupon holder 100 are described throughout this disclosure with reference to their use with return coupons 105, in other embodiments, the return coupon holder 100 may be used to hold a gift card, token, store credit receipt, voucher, other redeemable paper document, or the like. Embodiments of the return coupon holder 100 and related systems and methods described herein may also apply to these and/or other types of redeemable paper or plastic articles, or the like.

Figure 1E:
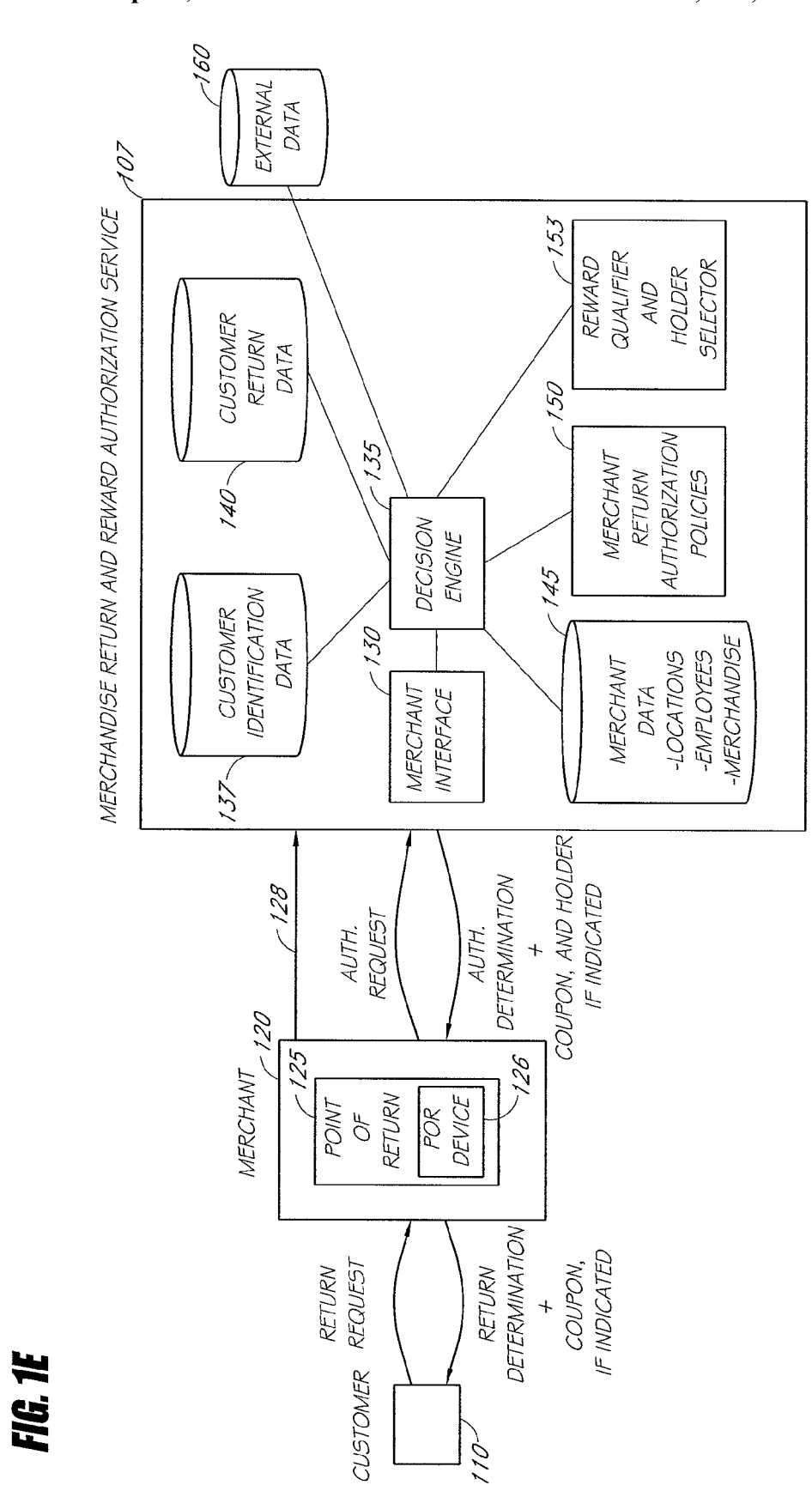
FIG. 1E is a block diagram depicting one embodiment of a system for issuing coupons and coupon holders at a merchant's point of return.

FIG. 1E is a block diagram depicting one embodiment of a system for issuing coupons and coupon holders at a merchant's point of return. A customer 110 who wishes to return previously purchased merchandise brings the merchandise to a point of return 125 at a merchant establishment 120 and requests to receive an equivalent dollar amount of either cash, credit, merchandise, or some combination or equivalent thereof.

In some embodiments, the customer 110 may be offered an incentive not to return the merchandise. For example, the customer 110 may be offered an "instant discount", a coupon, or other reward in exchange for agreeing not to return the merchandise. In various embodiments, an "instant discount" is a rebated amount of cash, credit, or other tender that the merchant 120 provides to the customer 110, either directly, into an account associated with the customer 110, as a store credit, or the like. The amount of the instant discount may be based, for example, on the original purchase price or current purchase price of the merchandise that the customer requested to return, such as an instant discount of 10% or 15% of the purchase price. The payment of such an instant discount to the customer may allow the merchant to avoid even higher costs associated with acceptance of the return.

The merchant 120 may additionally or alternatively offer the customer 110 a return coupon holder 100 with a return coupon 105, valid for an immediate purchase or good towards a future purchase, as an incentive not to make the return. In some embodiments, the customer 110 may be offered the choice of receiving an instant discount or a coupon as a reward for discontinuing the requested return. In some embodiments, the customer 110 may be offered both the instant discount and the coupon. In some embodiments, the customer 110 may be offered another type of reward as an incentive. In some embodiments, customers requesting returns may be allowed to accept an incentive even if the customer decides to make the return.

If the customer 110 decides to go ahead with the merchandise return, a clerk at the point of return 125 may offer the customer 110 a return coupon holder 100 with a return coupon 105. Such a return coupon 105 may foster goodwill towards the merchant 120 on the part of the customer 110; the return coupon 105 may also encourage the customer to make another purchase.

In some embodiments, as will be described in greater detail below, the merchant may make use of a computerized rewards authorization system to assess a likelihood of fraudulent behavior on the part of the customer 110 and/or to select terms for an instant discount, a coupon, or other reward being offered to the customer 110. A computerized rewards authorization system may also be used to track information about rewards that have been offered to customers. Such rewards, including return coupons 105, may be issued selectively and/or may be customized to the customer and store, based on a wide variety of factors, as will be described in detail with reference to FIG. 6 to follow. Alternatively, the rewards may be issued to all customers requesting to make merchandise returns, or, may be issued on a random basis.

As depicted in FIG. 1E, aspects of the system for issuing rewards at a point of return may be carried out by a service provider that also provides merchant return transaction authorization services. Thus, in some embodiments, some or all of the information that may be gathered and analyzed for purposes of authorizing a requested merchandise return may also be used, either alone or in combination with other information, to determine whether to provide a return coupon 105 and a return coupon holder 100 to a customer at a point of return 125, and, if so, to determine what type of coupon 105 and holder 100 to offer. Such a service is referred to with reference to the embodiment depicted in FIG. 1E as a merchandise return and reward authorization service 107. However, it should be understood that, in other embodiments, the reward-related systems and methods described herein may be carried out by another embodiment of a reward authorization service 107, such as a provider that makes automated return-related coupon determinations, but that does not make risk assessments or other determinations regarding the acceptance, denial, or authorization terms of merchandise return transactions requested by customers. In some embodiments, for example, rewards may be provided to randomly selected customers who are requesting to make merchandise returns. Alternatively, the systems and methods described herein may be used to provide incentives, in the form of return-related rewards, to customers not to make returns. Thus, the description of the coupon-and-holder-related systems and methods carried out in conjunction with various return authorization systems and methods is intended as an example for purposes of illustration only and is not intended to limit the scope of the reward-related systems and methods described herein.

In some embodiments, a clerk processing the return may send data about the requested return transaction to a merchandise return and reward authorization service 107 and may receive in response a return authorization determination that instructs the clerk to either accept or deny the return transaction. The clerk may offer the customer 110 a return coupon 105, as will be described in greater detail, either in response to the authorization determination received for the requested transaction, or as part of a return transaction that does not include an authorization determination. In some embodiments, the merchandise return and reward authorization service 107 may randomly select customers requesting merchandise returns to whom to issue a return coupon 105. Furthermore, the merchandise return and reward authorization service 107 may instruct the clerk as to a type of return coupon holder 100 from amongst two or more types of return coupon holders 100 in which to offer the customer 110 the return coupon 105. Additionally or alternatively, the merchandise return and reward authorization service 107 may cause a return coupon 105 to be printed out at the point of return 125, which, in combination with the return coupon holder 100 provides information, such as a category assignment, about the customer 110 and/or about the return transaction. In some embodiments, the return coupon holder 100 includes an RFID or other electronic and/or trackable device that provides information about the customer's 110 subsequent activities. In some embodiments, return coupon holders 100 of one or more types are available at the point of return 125 for distribution together with the return coupon 105 by the clerk. Additionally or alternatively, one or more devices at the point of return 125 may print or otherwise create the return coupon holders 100 at the point of return 125.

The point of return 125 may be a desk or location within the merchant establishment 120 that is dedicated for processing merchandise returns. Alternatively, the point of return 125 may be a normal cashier's station that may be additionally used for processing purchases and other types of business transactions, or the point of return 125 may be another location.

In still other embodiments, especially where the merchant is operating via the Internet or other online or electronic system, or in association with a television-based or telephone-based merchant system, the point of return 125 may not be at a specified physical location. For example, for an Internet-based retailer operating over the World Wide Web, the point of return 125 may be embodied as part or all of a web page that can be used by customers to transact some or all of a merchandise return process. As another example, in conjunction with a phone-based merchant system, a customer may transact some or all of a merchandise return process by using a telephone keypad and/or interactive voice response (IVR) system to access a portion of the merchant's system that serves as the merchant's point of return 125. Embodiments of the point of return coupon system described herein may be carried out at any of these or other physical or non-physical types of merchant points of return 125.

For purposes of this disclosure, the systems and methods described herein will frequently be described with reference to a clerk or other merchant employee who receives a merchandise return request from a customer 110 and who accepts or denies the return request, based, at least in part, on a recommendation received from one or more of the systems and methods described herein and who may offer a coupon or other reward and a holder 100 to a customer according to systems and methods described herein. In various embodiments, the actions that are attributed to the clerk may alternatively or additionally be carried out by another type of merchant employee or representative, or other person authorized to handle the merchandise return, or by an automated process or system or apparatus configured to process the return request and/or the coupon distribution. Thus, while, for ease of description, the systems and methods will be described with reference to a clerk at a point of return 125, it should be understood that embodiments of the systems and methods may also be carried out with one or more of the above-listed, or other, clerk alternatives.

The clerk may use an automated point of return (POR) device 126 for processing the requested merchandise return. In various embodiments, the POR device 126 may be used to input information about the requested return and to provide a clerk with authorization information for the return. The POR device 126 may also provide a recommendation to the clerk to offer the customer an "instant discount" as an incentive not to make the merchandise return. The POR device 126 may also be used to provide a return coupon 105 in a return coupon holder 100 to be presented to the customer who is making a return. In various embodiments, the POR device 126 may print the return coupon 105 for offering to the customer, may instruct another device to print the coupon, may electronically enter data about the coupon to a loyalty or other store-related card or data storage medium, may instruct a clerk to provide or not to provide a pre-printed coupon to the customer, or may participate in another form in the process to provide coupons to customers at a point of return 125. Furthermore, in various embodiments, the POR device 126 may print the return coupon holder 100 for offering to the customer, may instruct another device to print the return coupon holder 100, may electronically enter data about the return coupon holder 100 to a loyalty or other store-related card or data storage medium, may instruct a clerk to provide or not to provide a return coupon holder to the customer, may instruct a clerk to provide one of two or more different types of return coupon holder to the customer, and/or may participate in another form in the process to provide return coupons 105 and return coupon holders 100 to customers at a point of return 125.

In some embodiments, the POR device 126 may be a device that is dedicated for use with merchandise returns and may be used in association with the systems and methods described herein. One embodiment of such a dedicated POR device 126 is described with reference to FIG. 3 below. In other embodiments, the dedicated POR device 126 is at least one of: a hand-held device, a wireless device, a telephone-assisted device, a self-serve kiosk, an assisted-return kiosk, or other suitable apparatus.

In some embodiments, rather than using a dedicated POR device 126, a multi-functional check-out terminal or other computerized device may be configured to provide some or all of the functionality associated with the POR device 126 described herein. In some embodiments, more than one device may be used to provide some or all of the functionality described herein for the POR device 126. For example, one or more auxiliary printing devices or other distribution device may be used in conjunction with the POR device 126 to provide one or more return coupons and/or return coupon holders 100 to a customer at a POR 125. Thus, while the systems and methods described herein may be described with reference to a dedicated POR device 126, it is to be understood that a wide variety of dedicated and/or multi-purpose POR devices 126 may be used, alone or in combination, without departing from the spirit of the invention as described herein.

As depicted in FIG. 1E, authorization determination for the customer's requested return and/or determination of whether to provide a return coupon 105 and return coupon holder 100 and of which return coupon holder 100 to provide may be handled by an automated merchandise return and reward authorization service 107. The merchandise return and reward authorization service 107 may accept information input by the clerk at the point of return 125 and use various types of information associated with the requested return in order to implement the merchant's 120 return policy to assess risk of exposure to fraudulent, abusive, or unprofitable behavior that may be associated with accepting the requested return and to determine whether to offer a reward to the customer. Furthermore, if a return coupon 105 is to be issued, the information may be used to determine a type of return coupon holder 100 to provide with the coupon 105.

Additional store-related information 128 that may not be directly related to the current return transaction may be received by the merchandise return and reward authorization service 107 from the merchant 120. For example, information about inventory, marketing promotions, sales transactions, other reward programs, customers' purchase and return histories, information on the return rates of specific items, and the like may be sent by the merchant 120, or by another entity on behalf of the merchant 120 to the merchandise return and reward authorization service 107. Additionally or alternatively, information about the merchant's merchandise mix, mix of sales by SKU identifier, mix of inventory by SKU identifier, store sales performance, store profitability, average sale amount for the store, average return amount for the store, current coupon promotions, current sales promotions, store location, and local demographics may be provided to the merchandise return and reward authorization service 107. The store-related information 128 may be sent nightly, weekly, on an as-need basis, on a continual basis, or at another convenient schedule.

In some embodiments, the merchandise return and reward authorization service 107 may be implemented, as depicted in FIG. 1E, as an entity external to the merchant 120 whose services are contracted or otherwise provided to the merchant 120. Additionally or alternatively, some or all of the merchandise return and reward authorization service 107 may be implemented as one or more software and/or hardware components under the operation of the merchant 120 that function in the POR device 126 and/or within one or more computer devices at the point of return 125, at another location within the same physical merchant establishment and/or at a geographically removed location used by the merchant 120. Thus, although the systems and methods described herein are most often described in association with an external merchandise return and reward authorization service 107, it is to be understood that any combination of these or other implementation arrangements may be used without departing from the spirit of the invention described herein.

In embodiments where the merchandise return and reward authorization service 107 is a separate entity that authorizes requested returns presented to the merchant 120 and that makes reward-related determinations, communication between the merchant's point of return 125 and the merchandise return and reward authorization service 107 may be carried out using any of a wide variety of appropriate devices and/or communications and data security technologies. For example, the communications between a computerized device at the merchant's point of return 125 and a merchant interface 130 at the merchandise return and reward authorization service 107 may be carried out using the Internet or other global network. In other embodiments, the communications may be carried out using any communication system including by way of example, dedicated communication lines, telephone networks, wireless data transmission systems, two-way cable systems, customized computer networks, interactive kiosk networks, automatic teller machine-type networks, interactive television networks, and the like.

In various embodiments, the clerk handling the requested return uses the POR device 126 to send information about an authorization request to the merchandise return and reward authorization service 107. The merchandise return and reward authorization service 107 receives the information from the POR device 126, as well as the store-related information 128 from the merchant 120, and uses the information, together with other stored information, to make an authorization determination for the requested merchandise return, assessing the risk of accepting the return and implementing merchant return policy preferences to recommend either that the clerk accept the requested return, refuse to accept the requested return, or take another course of action. The merchandise return and reward authorization service 107 further uses at least some of the information received from the POR device 126 and the store-related data 128 to determine whether to issue a reward to the customer and, if so, to determine terms, such as return coupon holder 100 type, associated with the reward.

The embodiment of the merchandise return and reward authorization service 107 that is depicted in FIG. 1E includes a merchant interface 130, a decision engine 135, a customer identification data repository 137, a customer return data repository 140, a merchant data repository 145, a repository of merchant return authorization policies 150, and a reward qualifier and return coupon holder selector 153. Other embodiments of the merchandise return and reward authorization service 107 may include other components and/or a subset of these components. Furthermore, some or all of the components 130, 135, 137, 140, 145, 150, 153 may be implemented, in whole or in part, in one or more locations remote from the merchandise return and reward authorization service 107 and/or under the management of entities other than the merchandise return and reward authorization service 107. Some embodiments of the merchandise return and reward authorization service 107 may include only the decision engine 135 and may access some or all of the functions and data content available from the other modules 130, 137, 140, 145, 150, 153 from other external sources. For example, a database of coupon-and-holder-related information may be provided by a third-party or other source and may include coupon-and-holder-related information, such as, for example, who received coupons, instant discounts, or other return-related rewards, at what merchant they were received, whether or not the coupons were redeemed, whether merchandise purchased with a coupon was subsequently returned, and the like.

The merchant interface 130 receives an authorization request from the merchant point of return device 126 and accepts information about the requested merchandise return sent from the POR device 126. The received information is sent to a decision engine 135 for determining whether to offer a coupon and coupon holder and for assessing risk associated with accepting the requested merchandise return and for making an authorization determination that is based on the assessed risk as well as on stored information about the merchant's return authorization policies 150. The return policy 150 may be implemented in a variety of computer-usable forms, including, but not limited to, rule-based systems, decision trees, scorecard systems, and the like. In various embodiments, the decision engine 135 may assess the requested return transaction with reference to one or more threshold conditions, such as an acceptable score. In some score-based embodiments, in which, for example, a high score indicates low authorization risk, if the requested return transaction meets or exceeds the threshold, the return is accepted, while if the requested return does not meet the threshold, the return is denied. In other embodiments, other methods of assessing whether to accept the requested return may alternatively or additionally be used.

In various embodiments, the decision engine 135, in conjunction with the reward qualifier and holder selector 153, determines whether or not to issue a coupon for use by a customer at a point of return, and, if yes, determines terms to be included on the coupon, such as a percentage or dollar amount discount offered by the coupon, duration of validity, limitations based on eligible products, departments, or merchants, whether or not the coupon may be used online or in a physical store or both, and the like, as well as the type of return coupon holder 100 to use to hold the coupon 105.

In some embodiments, a determination whether to offer a coupon and coupon holder at the point of return is carried out separately from the return authorization, if one exists. In other embodiments, once the decision engine 135 has made a return authorization determination, the decision engine 135 invokes the reward qualifier and holder selector 153 as a sub-process, requesting that the reward qualifier and holder selector 153 make the coupon-and-holder-related determination and report back to the decision engine 135, so that the decision engine 135 may forward the coupon-and-holder-related result, together with the return authorization determination, to the point of return 125.

In various embodiments, the decision engine 135 and the reward qualifier and holder selector 153 may be configured in a wide variety of configurations that allow the decision engine 135 and the reward qualifier and holder selector 153 to cooperate to carry out the decision-making functions described herein. In some embodiments, the reward qualifier and holder selector 153 is implemented as a set of rules or policies that are carried out by the decision engine 135. In some embodiments, the reward qualifier and holder selector 153 is implemented as a component with decision-making capabilities that can execute coupon-and-holder-related determinations separately from the decision engine 135.

Functions performed by or in conjunction with the reward qualifier and holder selector 153 may be carried out in any of a wide variety of suitable, computer-implemented forms, such as a decision tree, an expert system, or other ruled-based decision system, as a linear calculation or other scoring mechanism, or as a form of probabilistic or neural network, genetic, or other statistical model or algorithm for decision-making. A more detailed description of factors that may be used by the decision engine 135 and/or reward qualifier and holder selector 153 to make a return authorization determination and/or to determine whether to issue a coupon and coupon holder associated with the requested return as well as determining terms associated with an issued coupon, such as return coupon holder 100 type, will be provided with reference to FIG. 6 to follow.

The decision engine 135 and/or reward qualifier and holder selector 153 may use information from one or more other repositories of data collected and maintained by the merchandise return and reward authorization service 107, or from one or more external merchant or non-merchant data sources 160. For example, information from the database of customer return data 140 may comprise return history data about prior merchandise returns associated with the customer and about other customers that may be used in the determination. Information about the items returned and about the customers may be included.

For example, in addition or as an alternative to the store-related data 128 received from the merchant 120, the decision engine 135 and/or reward qualifier and holder selector 153 may access stored merchant data 145 that may include any of a wide variety of types of information associated with the merchant 120, including, but not limited to: information about current sales promotions, information about current inventory, and other information that might influence a retailer's decision to offer a coupon to a consumer.

In addition, the stored merchant data 145 may contain: information about the location(s) of the merchant's stores or other establishments, information about the merchant's employees (including names, identification numbers, hire dates, home addresses, past association with proper, fraudulent, and/or questionable merchandise returns, and the like), and information about the merchant's 120 inventory of merchandise.

The decision engine 135 and/or reward qualifier and holder selector 153 may use information stored in a repository of customer identification data 137. The repository of customer identification data 137 may store information about a large number of customers, including, for example, information about customer names, addresses, identification numbers, such as driver's license and other identification numbers, biometric identification information, and the like. This information may be used in an effort to positively identify the customer 110 and/or to correlate data about the customer received from other sources.

The decision engine 135 and/or reward qualifier and holder selector 153 may also use information from one or more repositories of customer return data 140, which include a wide variety of information about past merchandise return activity associated with the individual customers 110, including past coupon-and-holder-related activity. Some examples of information associated with past purchase and return transactions are described in greater detail with reference to FIG. 6 below. In some embodiments, the customer return data repository 140 may also include information about the customer's 110 purchase history. Using the customer identification data 137 and the customer return data 140 allows the decision engine 135 and/or reward qualifier and holder selector 153 to link information about past merchandise purchase and/or return activity with the customer 110 requesting the return at the point of return 125. Such information allows the decision engine 135 and the reward qualifier and holder selector 153, among other capabilities, to assess the customer's product preferences, return and purchase patterns, and past coupon use patterns. In addition, information on past types of return coupon holders 100 issued to the customer, possibly in conjunction with information about associated additional purchases or other immediately subsequent in-store activities may be accessed and used. In various embodiments, this information may be used by the decision engine 135 and/or the reward qualifier and holder selector 153 to determine whether to provide a coupon and holder as well as to identify coupon terms and holder type that are expected to appeal to the customer and further the merchant's business goals.

In some embodiments, a "negative file," such as a listing of customers 110 who are known to have been involved with past fraudulent returns or past criminal activity, may be maintained and used to make return authorization determinations. In some embodiments, one or more "positive files" may exist that list customers who may be accorded special treatment by the return authorization service. For example, one or more positive files may be maintained to list customers known to be profitable to the merchant and/or customers in the entertainment or fashion industries who may need to purchase and return merchandise on a frequent basis, or other categories of customers, who may be accorded special return privileges. Such positive and negative files may be used to make return authorization determinations, and, where appropriate, they may be used as part of a process for making coupon-and-holder-related determinations, as well.

In some embodiments, agreements may be implemented allowing merchants to share their collected data for return authorization purposes.

Furthermore, the decision engine 135 and/or reward qualifier and holder selector 153 may additionally or alternatively access and make use of information stored in data repositories that are external to the merchandise return and reward authorization service 107. External data sources may be used to access information such as, for example: customer and/or employee identification information, address information including postal box information, credit data, shoplifting data, crime data, identification theft data, sales tax data, online shopping data, such as from Internet retailers or other e-commerce data sources, or any of a wide variety of other useful information types. Such external data may be accessed externally on an as-needed basis and/or may be stored by the merchandise return and reward authorization service 107 for subsequent use.

In some embodiments, once the decision engine 135, in conjunction with the reward qualifier and holder selector 153, has made an authorization determination for the requested return and any associated coupon-and-holder determinations, the merchant interface 130 may send one or more messages to the point of return device 126, informing the clerk of the determinations. In some embodiments, the point of return device 126 may print a record of the requested return, indicating that the return has been accepted or denied. The POR device 120, or another device, may further print or otherwise make available a coupon 105 and/or a coupon holder 100, as will be described in greater detail with reference to FIGS. 5A and 5B.

For ease of description, the merchandise return and reward authorization service 107 as depicted thus far in the disclosure and with reference to FIG. 1E has been described as providing merchandise return authorizations, coupon and/or holder determinations, and other related services to a single merchant 120. However, it is to be understood that, in practice, it is much more common for the merchandise return and reward authorization service 107 to serve a plurality of merchants 120. When the merchandise return and reward authorization service 107 serves a plurality of merchants 120, it may maintain an associated plurality of data stores, including, but not limited to: the customer return data repository 140, the merchant data repository 145, the merchant return authorization policies 150, and the reward qualifier and holder selector 153, for each of the merchants 120 for whom it provides return authorization and/or coupon-and-holder-related services. The merchandise return and reward authorization service 107 may maintain these data stores separately, either logically and/or physically. Furthermore, the merchandise return and reward authorization service 107 may combine some or all of the various data stores described above.

Thus, although a wide variety of embodiments exist, for ease of description in this disclosure, it will be assumed that the embodiments of the merchandise return and reward authorization service 107 described herein maintain data received from different merchants 120 separately, and do not use data received from one merchant to make authorization return determinations or coupon determinations for another merchant. In other embodiments, however, modifications may be made to the systems and methods described herein such that the systems and methods may store data from a plurality of merchants together and/or may use data from one merchant in a return authorization and/or coupon-and-holder determination request from another merchant. Furthermore, data from external third-party data providers, such as government information sources, credit bureaus, police information sources, and the like may be used by the merchandise return and reward authorization service 107 to make authorization and/or coupon determinations for the merchant 120.

The merchandise return and reward authorization service 107 and included modules 130, 135, 137, 140, 145, 150, 153, as depicted in FIG. 1E, are one embodiment of a merchandise return and reward authorization service 107 in connection with the systems and methods described herein. It is to be understood that in other embodiments, the structures and functions of these modules may be implemented in a wide variety of different configurations without departing from the spirit of the systems and methods described herein. For example, some or all of the data storage functions, the decision-making functions, the communications functions, the authorization determination, the reward qualifier and holder selector 153 and the like, may be provided by external third-party service providers, may be implemented at one or more merchant locations, including within the POR device 126, and/or may be implemented differently using different internal structures. Furthermore, although the merchandise return and reward authorization service 107 is depicted in FIG. 1E as being a single entity located at a single location, it is to be understood that in other embodiments, the structures and functions of the coupon/return authorization service 107 may be implemented in total or in part by a distributed system of hardware and software that may be located at two or more physically distinct locations.

Figure 2:
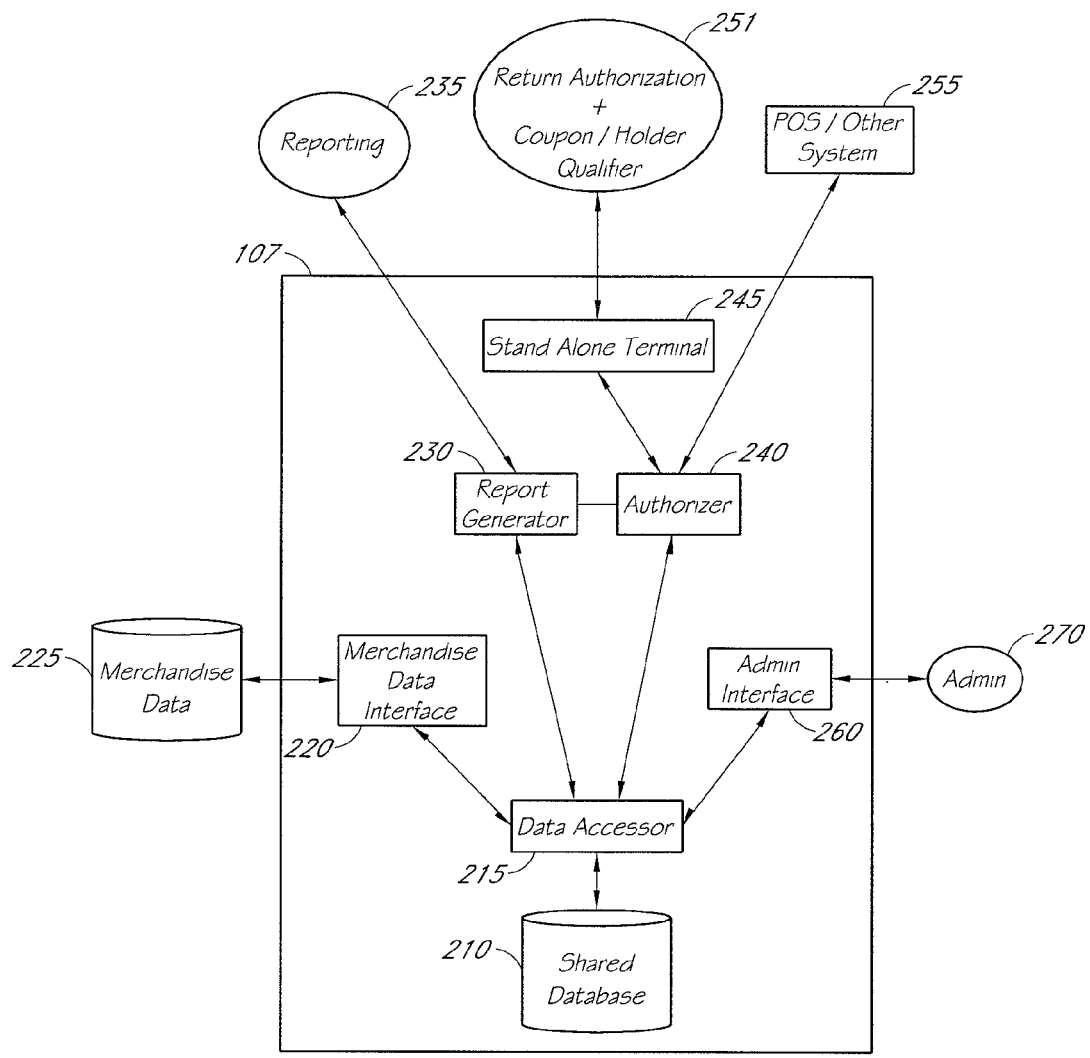
FIG. 2 is a block diagram depicting a closer view of one embodiment of a return authorization service, including a coupon/coupon holder qualifier.

FIG. 2 is a block diagram depicting a closer view of one embodiment of a merchandise return and reward authorization service 107 that provides a variety of services, including coupon qualification and generation, as well as coupon holder type selection and return authorization, to the merchant 120. In FIG. 2, the various repositories of data used by the merchandise return and reward authorization service 107 for purposes of coupon qualification, coupon holder selection and/or return authorization, as described in part with reference to FIG. 1E, are combined conceptually as a single shared database 210. As described with reference to FIG. 1E, the data stored for use by the merchandise return and reward authorization service 107 may be stored and maintained as a single or a plurality of data repositories.

The data in the shared database 210 is managed by a data accessor 215 that receives data for storage in the shared database 210 from a variety of sources and that receives requests for data from the shared database 210 for a variety of purposes. In various embodiments, the data accessor 215 may manage the various types of data using any of a variety of computer-implemented platforms suitable for such purposes, including, but not limited to, DB2, Oracle, other SQL-based systems, or other database or file storage technology.

As depicted in FIG. 2, merchandise data 225 from a merchant 120 may be sent to a merchandise data interface 220 of the merchandise return and reward authorization service 107 for storage in the shared database 210 by the data accessor 215. For example, sales data, including very current sales data that may track real-time response to a given type of coupon, a coupon in a given type of holder, and/or real-time inventory levels may be included in the merchandise data 225.

Administrators 270 may use an administrative interface 260 of the return authorization service to send and receive data to the data accessor 215.

The data accessor 215 may further provide data to a report generator 230 that provides reporting services 235 to the merchant 120. For example, one or more reports about levels of coupon redemption, about choices made by customers with respect to coupon redemption, about the distribution and use of different types of return coupon holders 100 and the like, may be included in reports from the report generator 230. Reports for merchants may include daily transaction reports, as well as longer term reports for loss prevention analysis.

Reports may additionally or alternatively be made available to customers 110 who have received coupons, instant discounts, or other return-related rewards. The reports may include, for example, information about a dollar amount and/or a percentage saved by the customer 110 using one or more coupons, information about types of merchandise purchased with a coupon, information about a number or percentage of coupons received at a point of return that were actually redeemed by the customer, and/or information about a potential percentage or dollar amount saved if all return-related coupons had been redeemed by the customer.

An authorizer module 240, which may comprise, for example, reward qualifier and holder selector 153 and/or the decision engine 135 that are described with reference to FIG. 1E, provides coupon determinations 251 and return authorization. As depicted in the embodiment shown in FIG. 2, the authorizer 240 may communicate directly with a stand-alone terminal 245 that is dedicated for point of return use. The authorizer 240 is further configured to communicate with a point of sale or other system 255 used by the merchant to process merchandise returns, issue coupons, and to communicate with the merchandise return and reward authorization service 107.

In various embodiments, transfer of some or all of the data into and out from the merchandise return and reward authorization service 107 may be implemented, for example, using FTP transfer protocols. For protection of consumer privacy and merchant business information, the data is preferably transferred into and out from the merchandise return and reward authorization service 107 in an encrypted form, for example using PGP (Pretty Good Privacy) or other suitable encryption technology.

The functions and/or components of the merchandise return and reward authorization service 107 described with reference to FIG. 2 may be implemented, in some embodiments, as a plurality of servers operating as a server farm under the management of any of a variety of clustering technologies. Such an arrangement typically allows for relatively seamless replacement of components as well as upgrades and additions to the system as transaction volume increases.

Furthermore, the functions and/or various modules of the merchandise return and reward authorization service 107 may be implemented in various embodiments using personal computers (PCs), workstations, other processors, program logic, or other substrate configurations representing data and instructions, which operate as described herein. In various embodiments, the processors may comprise controller circuitry, processor circuitry, processors, general purpose single-chip or multi-chip microprocessors, digital signal processors, embedded microprocessors, microcontrollers and the like.

Figure 3:
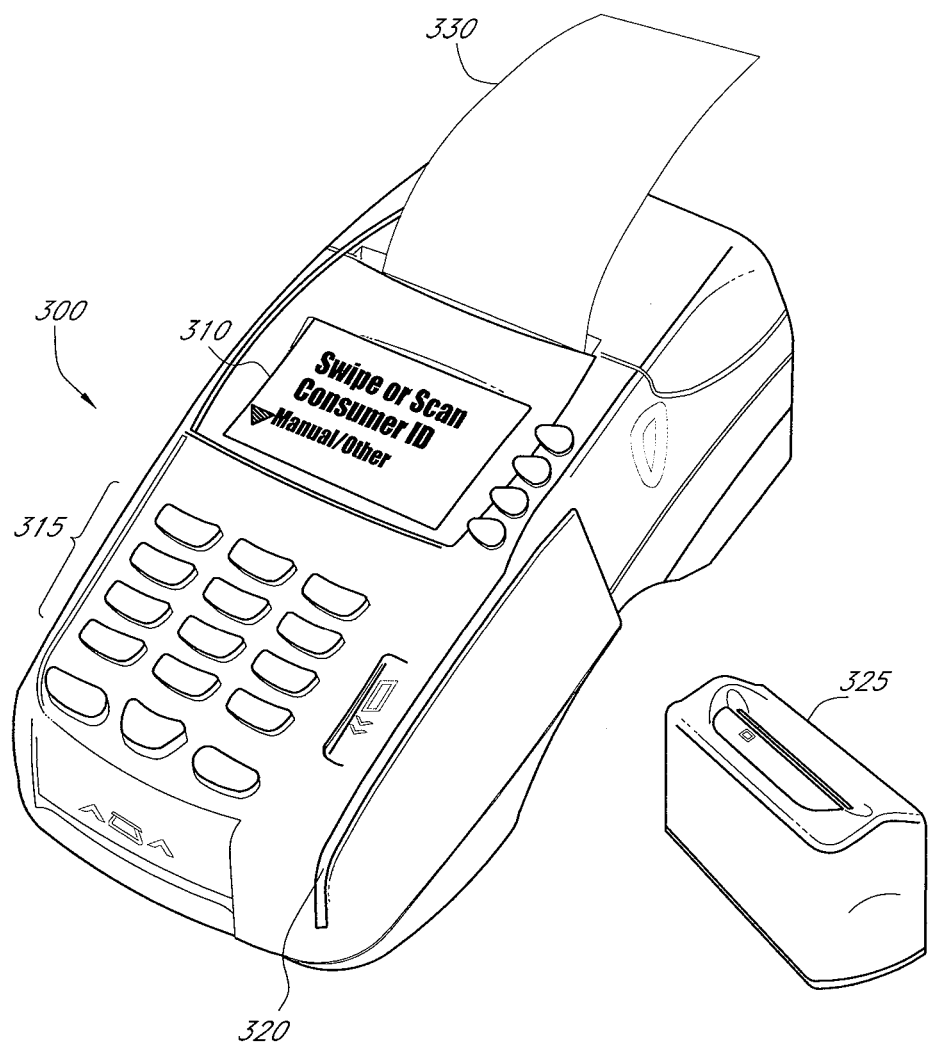
FIG. 3 depicts one embodiment of a dedicated point of return device.

FIG. 3 depicts one embodiment of a dedicated point of return (POR) device 300 for use in association with requested merchandise returns. The POR device 300 in FIG. 3 is configured to use a telephone dial-up connection or network cable connection to communicate with a reward authorization service such as the merchandise return and reward authorization service 107 described with reference to FIGS. 1E and 2. In other embodiments, one or more other wired or wireless communications systems are used for communicating. In some embodiments, some or all of the functions provided by the reward qualifier and holder selector 153 may be provided by components that are internal to the POR device 300.

As depicted in FIG. 3, the POR device 300 includes a display screen 310 for communicating visually with a clerk or other person handling the requested return transaction. Examples of communications that may be presented on the display screen 310 are described with reference to FIG. 4 to follow. In other embodiments, the POR device 300 may include audio speakers, video display, or any of a wide variety of other communications technologies for communicating information to the clerk.

The POR device 300 also includes a keyboard 315 with a plurality of buttons that allow the clerk to input information to the POR device 300. Additionally, other buttons and input systems in other parts of the POR device 300 also allow the clerk to input information to the POR device 300. In other embodiments, any of a wide variety of other input systems, such as voice recognition systems, keyboards, touch screen systems, camera or video systems, biometric systems, and the like, may be used additionally or alternatively for allowing the clerk to input information into the POR device 300. Furthermore, other forms of electronic reading devices, including, but not limited to, 1-dimensional, 2-dimensional, or 3-dimensional barcode scanners, magnetic stripe readers, readers for other electronically-readable codes, RFID readers, any of a wide variety of biometric data input devices, and the like, may be used to input data to the POR device 300. For example, the POR device 300 depicted in FIG. 3 includes a built-in magnetic stripe reader 320 for scanning identification cards, credit cards, and the like that include a magnetic stripe, and a peripheral 2-dimensional bar code scanner 325 for reading cards provided with a 2-dimensional barcode. Other peripherals for inputting data about a wide variety of other identification and informational sources may also be used.

Various types of data about the requested return merchandise may be collected for a return transaction, including, for example, amount, type, and value of items being presented for return. In some embodiments, product identifiers, such as a Stock Keeping Unit code (SKU), Universal Product Code (UPC), Radio Frequency Identifier (RFID), and the like, may be used to identify the merchandise and may be further used to access stored information about the merchandise. Other data about the current return transaction, and about one or more original purchase transactions associated with the merchandise to be returned, such as receipt identifier, date and time, and store number and location, transaction identifier, cashier identifier, register number, and the like may also be collected by the POR device 300.

As shown in FIG. 3, the POR device 300 may be configured to produce a paper receipt 330 or other record of the merchandise return transaction for the customer 110 and/or for the clerk on behalf of the merchant 120. In some embodiments, the POR device 300 may be configured to produce a return coupon 105 and/or a return coupon holder 100. In other embodiments, a record of the transaction may additionally or alternatively be provided to the customer 110 using email or other electronic communications technology. Where the customer 110 is requested to sign a record of the return transaction, the POR device 300 may include a system for electronically capturing the signature or other form of customer acknowledgement. In some embodiments, a coupon that is provided to the customer 110 at the point of return 125 is printed, or otherwise displayed, on the receipt 330. In other embodiments, the POR device 300 prints a coupon and/or a coupon holder that is not associated with a receipt. Furthermore, in some embodiments, a coupon is provided to the customer by electronically crediting a loyalty account, credit card account, or other digital account associated with the customer as an alternative or an addition to issuing the customer a physical coupon. In some embodiments, the POR device 300 communicates with a peripheral printer or other external device for providing the coupon and/or the coupon holder to the customer.

As described above, the functions of the POR device 300 may additionally or alternatively be provided by other types of electronic devices, such as a suitably programmed and configured point of sale (POS) terminal, cash register terminal, or other device that may process merchandise returns as well as other types of transactions and that may use technologies such as biometrics, bar-code readers, any of a variety of printing or other coupon-generation technologies, and the like.

Figure 4:
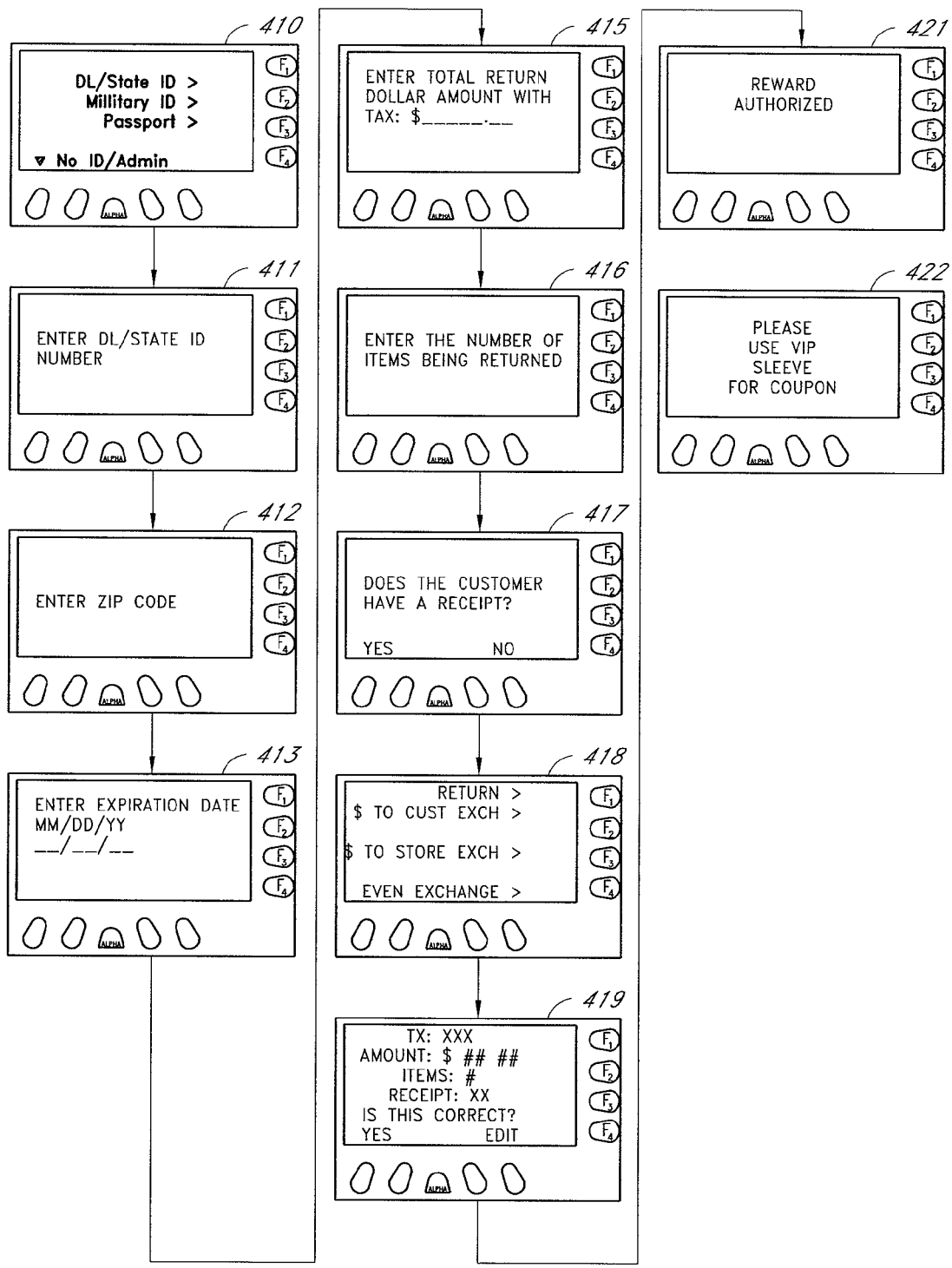
FIG. 4 depicts one embodiment of a series of user interface screenshots for processing a return transaction, including providing instructions regarding a return coupon holder.

FIG. 4 depicts a series of sample user interface screenshots 410-413, 415-419, and 421-422 for one embodiment of a process for collecting data at a point of return 125 and for instructing a returns clerk about the coupon holder 100 to be provided to the customer, if any. The screenshots 410-413, 415-419, and 421-422 depicted in FIG. 4 exemplify screenshots that may be presented on a display screen 310 of a POR device 300 such as the one depicted in FIG. 3.

The screen shots 410-413, 415-419, and 421-422 represent prompts to the clerk to input information associated with the requested merchandise return so that a coupon determination and coupon holder selection may be made for a requested return. In the sample screenshots shown in FIG. 4, the first four screenshots 410-413 represent prompts for information about the customer 110 requesting to make the return. Screenshots 415-418 represent prompts for the clerk to input information about the requested merchandise return transaction, if any, and Screenshot 419 represents a prompt for the clerk to verify, and, if need be, edit, the information previously input to the POR device 300 before the information is sent to the reward authorization service 107 with a request for a return coupon decision and return coupon holder selection. Screenshots 421 and 422 provide the clerk with instructions about providing a return coupon 105 to the customer and about a type of return coupon holder 100, such as a "VIP" coupon holder, to use with the return coupon.

Describing the screenshots more specifically, in Screenshot 410, the clerk is prompted to indicate which kind (if any) of identification verification the customer 110 is providing. In Screenshot 411, assuming that the clerk indicates that the customer 110 is presenting a driver's license or other state identification card, the clerk is now prompted to input the driver's license number or state identification card number. As was discussed above, this information may be keyed in, read electronically from a magnetic stripe, barcode, or other smart card reader, or input using any of a wide variety of other input technologies.

Furthermore, in various embodiments, if desired, the POR device 126 may be configured to alternatively or additionally accept input about other types of identification, such as other types of U.S. government-issued identification numbers, or Canadian or Mexican identification numbers. Examples of identification that may be used, alone or in combination with one another, include, but are not limited to numbers, identifiers or other data associated with: student identification, military identification, passport, voter registration card, Immigration and Naturalization Service documents (such as a green card or laser visa), consular identifications (matricula consular and others), loyalty card, gift card, coupon, merchandise credit slip, receipt authorization code, checking account, receipt date or other combination of receipt data identifiers, name, address (current and/or past), data of birth, phone number, SSN, credit card, debit card, biometrics (photo, face, fingerprint, voice, DNA, retinal), employer identification number, digital image of the customer obtained from license, customer birth date and/or age, driver's license expiration date, security system number, and many other types of accounts and identifiers.

In Screenshot 412, the clerk is prompted to input the customer's zip code, which may be used, for example, to assist in verifying correct identification of the customer 110, as well as to provide information about the distance from merchant establishment to the customer's home, which may be used in some embodiments of the coupon determination. In Screenshot 413, the clerk is prompted to input the expiration date of the customer's driver's license or state identification card. In Screenshot 415, the clerk is prompted to enter the total dollar return amount requested by the customer 110. In Screenshot 416, the clerk is prompted to enter the total number of items being presented for return by the customer 110. In Screenshot 417, the clerk is prompted to enter whether the customer 110 has a receipt for the items being returned.

In Screenshot 418, the clerk is prompted to enter the type of return being requested by the customer 110. For example, the customer may be requesting to return the merchandise for a cash exchange (or credit to an account on which it was originally charged), for an even exchange with merchandise priced exactly the same, or for a merchandise exchange when a new merchandise purchase is presented to the clerk as part of the return transaction and for which a dollar balance is due to either the customer or to the store. In other embodiments, the customer may request and/or be offered an opportunity to exchange all or a portion of the merchandise for a gift card, store check, store credit, debit card, credit card, or other suitable tender or medium of exchange, and the POR device 126 may be configured appropriately to capture that information.

In Screenshot 419, the clerk is presented with a summary of the inputted transaction information. In some embodiments, the return transaction is assigned an identification number, and the clerk is prompted to verify that the exchange dollar amount and number of items have been correctly entered. The clerk is also prompted to verify whether a purchase receipt has been provided with the return request. The clerk provides an input indicating either that the information is correct or that the information needs to be edited.

In some embodiments, in an additional screenshot (not shown) the clerk is prompted to inquire if the customer would like to be considered for receiving a return coupon. In some embodiments, a determination of whether to offer a coupon to a customer is only carried out if the customer has expressed an interest in receiving a coupon. Furthermore, in some embodiments, customer return data is only used for determining whether to offer a return coupon, and, if so, which coupon to offer, and which coupon holder to select, if the customer has expressed an interest in receiving a coupon, which may be considered to be "opting-in" to a merchant reward program. In other embodiments, customers may be assumed to be interested in being offered a coupon and, thus, no "opting-in" question is asked of the customer.

In some embodiments, customers who have "opted-in" may have an opportunity to express preferences with regard to coupons. For example, the clerk may ask the customer coupon-and-holder-related questions, or may offer the customer a preference form to fill out, or use a touch screen to indicate preferences, or the customer may be emailed or mailed or reached by telephone to provide coupon preference information that the merchant may use in making this and/or future coupon-and-holder-related determinations.

In some embodiments, the "opting-in" prompt is presented before the summarizing Screenshot 419, which is amended slightly to include a reference to the customer's "opt-in" decision, so that the clerk may verify and, if need be edit, the opt-in decision in addition to the other return-transaction related information input into the POR device 300.

In Screenshot 421, an indication is provided to the returns clerk as to whether a return reward coupon 105 has been authorized for the customer making the return. In Screenshot 422, the clerk is prompted regarding the type of return coupon holder 100 that has been selected by the merchandise return and reward authorization system 107 to provide for the return coupon 105.

The screenshots of FIG. 4 have been provided as an example of a POR device 126 user interface interaction for inputting information about a requested merchandise return. As will be familiar to one of skill in the art, a wide array of variations may exist in the exact methods used to obtain information about the requested return at the point of return 125. In some embodiments that are configured to offer instant discounts, pre-return coupons, or other incentives for the customer not to make the return transaction, the screenshot prompts may direct the clerk to offer one or more incentives to the customer and to input information about the customer's acceptance of the incentive. In some embodiments, information about the requested return, the incentive offer, and the customer's response to the offer may be transmitted to the merchandise return and reward authorization service 107 for storage for future reference.

Thus, in various embodiments, the content and order of screenshot prompts may be different than those depicted in FIG. 4, and, in fact, the clerk may be expected to input the relevant data in response to an interactive voice response (IVR) system or without the use of prompts at all. In some embodiments, the POR device 126 may be configured to allow for the collection of some or all of the following additional information: retailer identification, consumer name and address, current price of the returned items, identifier (such as SKU number, UPC, or other type of identifier) of the returned items, product condition, customer's stated reason for making the return, purchase date, time, tender type, and original salesperson, original sales transaction identifier, as well as other types of information, such as the customer's stated preferences regarding coupon offers.

Furthermore, the POR device 126 may preferably be configured to automatically transmit some additional information to the reward authorization service 107 with the request for coupon decision. For example, an identifier associated with the POR device 126 may be transmitted to the reward authorization service 107 and may be used to identify the merchant 120, the store branch or other location at which the point of return device 126 is located, as well as the date and local time of the requested return transaction, and the like.

As will be described with reference to FIG. 6, in various embodiments, the determination whether to provide a coupon to the customer at the point of return 125, or otherwise in association with a requested return transaction, may depend on a wide variety of factors, some of which may involve the input of data at the point of return 125. Accordingly, the series of prompts that are displayed to the clerk may be adjusted to prompt for data appropriate to the given embodiment.

Figure 5:
FIG. 5 depicts two embodiments of return coupons that may be issued at a point of return.

FIG. 5 depicts two embodiments of return coupons 105 that may be issued at a point of return 125. Return coupons 105 depicted in FIG. 5 are embodiments of return coupons that may be printed in association with a requested return transaction by a dedicated POR device 300, such as the one depicted in FIG. 3, or by another type of device capable of printing. As depicted in FIG. 5, the coupons 105 include an indication of an offered discount, a name of the store at which the coupon 105 is valid, a return transaction identification number, an amount of the return, a time and a date of coupon issuance, and a date or time frame for which the coupon 105 is valid, which in some preferred embodiments, is the date on which the return transaction is requested. An identifier of the merchant location at which the return has been requested may also be included.

As depicted in FIG. 5, the coupon may express the discount as a percentage off the regular price or in terms of a dollar amount discount, or, in other embodiments, in other manners. In some embodiments, the coupon may specify whether the percentage discount applies to a single purchased item, to a single set of items purchased together, or to some or all of the customer's remaining purchases at the store on the date or time frame listed on the coupon 105. The coupons 105 may also include a scannable bar code or other identifier that allow the merchant 120 and/or the merchandise return and reward authorization service 107 to track redemption and use of the coupons 105. For example, in some embodiments, a scannable bar code or other identifier may allow the merchant to track whether the coupon is being redeemed by the customer to whom it was issued, or by another customer. The coupons 105 may also include text stating that they are not valid with other offers, other coupons, other promotions, and the like.

In other embodiments, the coupons 105 may have no printed date and/or no printed discount amount and/or other missing data, and may instead leave room for the clerk to manually enter a date of validity, a discount amount, and/or other missing data. In such embodiments, a plurality of the coupons may be pre-printed and available at the point of return 125 for use in conjunction with a plurality of return transactions. Furthermore, in such embodiments, the POR device 126 may receive information from the return authorization service and/or coupon issuing service 107 instructing the clerk regarding how to fill in the data missing from the coupon. In some embodiments, the clerk may be authorized to set the terms of the coupon issued by the automated system or to override and reset some or all of the coupon terms. In various embodiments, the coupon may be provided with a scratch-off portion, either pre-printed or printed for the customer that allows the customer to scratch off a coating to reveal a coupon value or the like.

The coupons 105 in FIG. 5 illustrates the use of a coupon with a very limited duration of validity, which in this case is one hour in length, in order to encourage the customer to use the coupon before leaving the merchant's store. In some embodiments, the expiration time and/or date may be variable, and may be dependent on other terms of the coupon. Coupon 105 may further include text that acknowledges, directly or indirectly, that a return transaction has taken place, or has at least been requested.

In some embodiments, the expiration time and/or date may be variable, and may be dependent on other terms of the coupon. Coupons 105 may also include a choice of discount offers, from which the customer may select as desired. In some embodiments, the coupon may additionally or alternatively include the customer's birth date, address, email address, and/or telephone number.

In various other embodiments, other types of coupons, with different features, as well as with some, all, or none of the above-described features, may be provided to customers. For example, in some embodiments, a discount may be offered at an affiliated or non-affiliated store as an alternative or in addition to offering the discount at the merchant's establishment 120. For example, a clothing retailer at a mall may issue a coupon for a restaurant at the same mall. Furthermore, in some embodiments, a coupon may be issued that is valid for a future date, rather than for immediate use, such as a coupon for use at a special sale event, a "Best Customers" day, a "Members Only" sale date or other occasion in which the merchant wishes to encourage the customer to participate.

In various embodiments, any of a wide variety of security features may be implemented with respect to the coupons in order to discourage fraudulent behavior, such as unauthorized copying or altering of coupons. For example, the use of checksums, invisible signatures or codes, unique paper signatures, such as those created using radio emitters or other technologies, as well as print-based methods, such as the use of random color, or invisible ink that can only be seen when swiped with a special pen, may be employed to reduce the risk of coupon-and-holder-related fraudulent behavior.

Furthermore, in various embodiments, the coupons may present any of a variety of special effects for the customers. For example, coupons printed on specially prepared thermal paper may use ink that is invisible until it is heated as it goes through a printer and that may be used to provide a colored border or other graphic design on the coupon. In some embodiments, coupons may be printed on thermal paper that has a perfume or other fragrant material whose scent is released when the paper is heated during printing.

Figure 6:
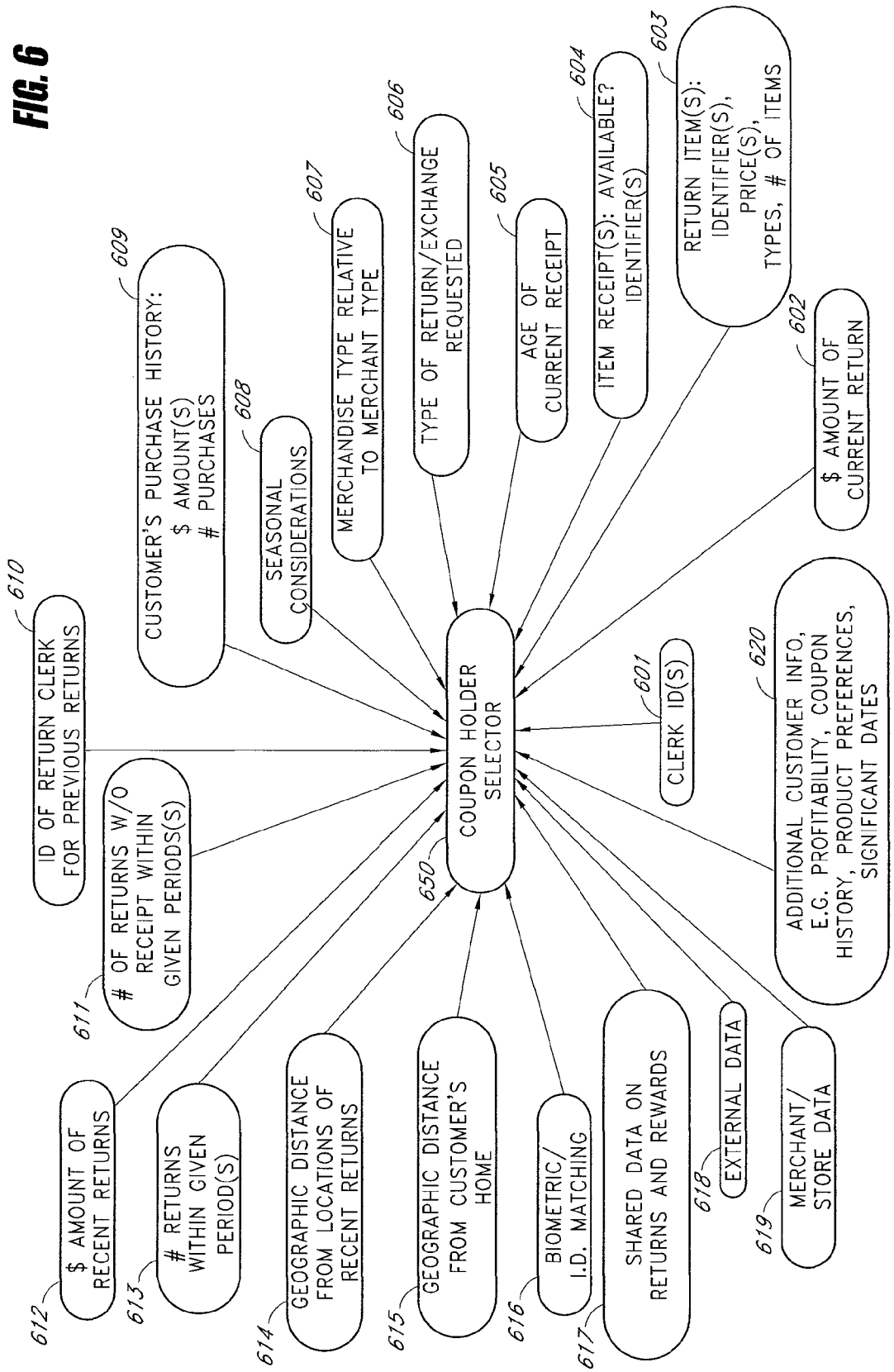
FIG. 6 depicts a set of factors that may be used to influence one embodiment of a process for determining whether to provide coupon holder for a reward at a point of return and/or for determining which coupon holder to provide.

FIG. 6 depicts a set of factors 601-620 that may be used to influence one embodiment of a process for determining whether to provide a return coupon holder at a point of return 125 and/or for determining which return coupon holder to provide. In other embodiments, a different set of factors, including some, all, or none of the factors depicted in FIG. 6, may influence the coupon-holder-related determination 650. Furthermore, some or all of the factors may also influence a determination as to whether to authorize the requested merchandise return transaction and whether to provide a return coupon to the customer.

Broadly speaking, the factors may include information about the current return, information about the customer's identification, information about the customer's past purchase and/or return history, as well as general information about the store and other related data. Some of the factors may be used to assess a measure of likelihood that the current requested return represents fraudulent and/or abusive behavior on the part of the customer with respect to merchandise returns, coupons, or a combination of the two. Some factors may be used more directly to determine which return coupon holder to provide with an offered return coupon.

For example, factors 601-607 associated with the current return transaction may include information about an identifier 601 for the clerk handling the return, and in some embodiments an identifier for the clerk(s) who handled the associated purchase transaction, a dollar amount associated with the requested return 602, the items in the current return 603, a receipt for the items being returned 604, the age of the receipt 605, the type of return 606 requested by the customer, and the type of merchandise being returned relative to the merchant type 607. Other factors associated with the current return transaction may include, but not be limited to, a location and/or identifier for the merchant, the day, date and/or time of the requested return, an amount of time lapsed since purchase of the items being returned, and information about other customers in the merchant location 120 during the time of the requested return transaction.

The dollar amount associated with the return 602 may include a net return dollar amount, for example, the dollar amount of the requested return without tax, or the net amount of the return with any discounts taken into consideration. The dollar amount 602 may additionally or alternatively include a net transaction amount that takes into consideration the amount of the return amount and the amount of any purchases and/or exchanges being made by the customer at the same time. In some embodiments, the determination of which type of coupon holder to provide is based largely on the net or gross dollar amount of the return transaction. In some embodiments, return amounts are grouped into two or more categories, and discernibly different coupon holders, such as coupon holders of different colors or background design, are offered according to the return amount category. In some embodiments, the coupon holder selector 650 engine may determine that for very low return amounts, no coupon holder 100 is provided, while for higher dollar-amount returns, coupon holders 100 will be used to help sales personnel to identify shoppers who may feel they have "extra money in their pocket" and be willing to make an additional purchase of a commensurate amount.

Information about items presented for return 603 may include information about one or more item identifiers (bar code, UPC, SKU, RFID, and the like), information about individual item prices and merchandise types, as well as a total number of items being returned.

Information about one or more purchase receipts 604 for the items being presented for return 604 may include, for example, date of the receipt, one or more data items that serve to identify the receipt, and whether a receipt is presented by the customer for each returned item.

Factors associated with the customer's identification may include a matching of the identification and/or biometric information 616 offered by the customer at the point of return 125 with stored identification and/or biometric information about the customer 110. For example, information about fingerprint, retina, voice and/or facial or other metrics may be used. Additionally, information about the customer's current and, possibly, past home addresses may be used to calculate the geographical distance 615 from the customer's home to the store. The customer's home address may also be compared to stored information about the clerk's home address in order to rule out a possibly fraudulent and usually forbidden processing of the return transaction by clerk who shares a home address with the customer 110. Additional information about the customer, such as, for example, birth date, state of residence, state of identification card, identification number, loyalty card number, gift card number, checking account number, coupon number, merchandise credit slip number, phone number(s), credit card number, check number, debit card number, receipt authorization code, license expiration date, and any information available on a driver's license or other presented form of identification may also be used in as factors.

In some embodiments, identification of the customer allows for determining whether the customer is included on a "positive list" of customers whose returns may be automatically accepted or authorized more easily, or a "negative list" of customers whose returns may be automatically rejected or scrutinized more carefully, or another subset of customers whose merchandise returns may be processed in a special manner. Furthermore, one or more coupon-related "positive" and/or "negative" lists may be used in making a coupon-holder selector 650.

Furthermore, other available types of information about the customer, such as credit information, check information address history, and possible shoplifting record or other criminal record information may also be useful as a factor.

A wide variety of factors regarding the customer's history of purchase and/or return transactions may influence the coupon-holder selector 650. For example, two factors are the number of returns 613 and the dollar amount of the returns 612, as well as the dollar amounts and identifiers of the individual merchandise items, that the customer has requested within one or more recent periods of interest, including, in some embodiments, the occurrence of any denied return transactions. Dates, times, and locations of previous requested returns may be a factor, as well as previous return authorization scores or other assessments determined for the customer and past returns for the same items as the current return. Another factor is the number of unreceipted returns 611 that the customer has requested within one or more recent periods of interest. The identifiers for the clerks handling previous returns 610, their coupon-related decisions (such as coupon overrides, changes to terms, and the like) and the geographic distances from the locations of other recent returns 614, as well as the number of returns within a predetermined geographic area, may be used as factors in the determination whether to issue a coupon and/or in the selection of a return coupon holder type.

In addition, in some embodiments, information about the customer's purchase history 609 with the merchant, including, for example, dollar amounts, numbers of items, price and identifiers of individual items, and number of recent purchases, payment types and payment history, previous coupons received, previous coupons used, previous authorization scores, and profitability 620 of the individual customer may influence the determination 650. Additional factors of interest associated with the customer's past transactions may include information about discounts and/or credit associated with previous purchases and/or overrides associated with past returns, as well as past payment information. Furthermore, additional personal information 620 about the customer, including, for example's product preferences, birth date and/or other significant personal dates, information about the redemption of previously issued coupons, and/or about returns of merchandise purchased with coupons may be factors in the determination 650. In some embodiments, information about the customer from the retailer's loyalty program may be used.

In general, in some embodiments, merchants may prefer to provide one type of return coupon holders 100 to shoppers who are known to be profitable customers of the store in order to have their sales clerks encourage another purchase by this type of customer, while preferring to provide another type of return coupon holder 100, or not to provide return coupon holders 100 at all, to shoppers whose present and/or past purchase and/or returns history may indicate that they are not profitable customers of the store.

In addition to the above-described factors, other factors may influence a coupon-holder selector 650, as suits the preferences of the merchant 120. As one example, the merchant 120 may desire to have seasonal considerations 608 influence the determination 650, for example, providing some coupon holders 100 that indicate a short-term validity period, such as for one hour or one day, and some coupon holders 100 that indicate a longer-term validity, such as for two weeks, or until an upcoming holiday, or the like. Seasonal considerations 608 may also affect subsequent determinations 650, such as in embodiments in which returns made during a holiday period are considered more likely to be returns of gifts and therefore more indicative of a customer's first time in the store. One or more appropriate coupon holders 100 may be selected based at least in part on this assumption.

Other types of information available from external sources 618, either publicly available free information and/or purchased information may serve as factors. For example, sales tax information, postal box information, census data, house-holding data, identification theft data, Department of Commerce data, credit data, bank data, check data, crime data, loan delinquency data, and the like may be received from sources external to the merchandise return and reward authorization service 107 and used to make a determination 650. Some or all such data 618 may be stored for later use and/or may be accessed from one or more external sources on an as-needed basis.

Data collected and/or maintained by the merchant 619 may include a wide variety of information. For example, information may be accessed from the merchant's and other merchants' inventory management, catalogs, and merchandise sales tracking systems. Information about the merchant's inventory, merchandise mix, mix of sales by SKU identifier, mix of inventory by SKU identifier, store sales performance, store profitability, average sale amount for the store, average return amount for the store, current coupon promotions, current sales promotions, store location, and local demographics may be used in a rewards qualifier determination 650. In addition, information from customer loyalty, discount, incentive, rewards and/or reward programs, including web-based coupons, web-based marketing information, web-based consumer activity-tracking information, and the like may be used in making a coupon holder selection determination 650.

Furthermore, data that has been collected by other merchants 617, including data collected in association with purchase and/or return transactions and authorizations, as well as return-related reward programs or other coupon-and-holder-related activity, including instant discounts accepted, returns of merchandise purchased with coupons, and the like, may be shared with the merchant 120 and used as factors in the determination 650.

As stated above, some or all of the factors 601-620 in FIG. 6 may influence one embodiment of a process for determining whether to provide a return coupon holder, and what type of return coupon holder 100 to provide, at a point of return 125. In other embodiments, a different set of factors, including some, all, or none of the factors depicted in FIG. 6, may influence the determination 650. Broadly speaking, the factors may include information about the current return, information about the customer's identification, information about the customer's past purchase and/or return history, as well as general information about the store and other related data.

With respect to the process for determining whether to provide a coupon holder to the customer, and, if so, which type of coupon holder, any one of the factors described herein with reference to FIG. 6 or in any other portion of this disclosure may be used by the decision engine 135 and/or reward qualifier and holder selector 153 as a single or separate factor, or may be used in combination with any subset of the factors 601-620 to make a determination 650. For example, in some embodiments, customer identification information 616 may be used in conjunction with any one or more of the following types of information to make a determination: original receipt date, dollar amount of the return without tax, net return transaction amount, number of items being returned, SKU identifier(s) for returned item(s), RFID identifier(s) for returned item(s), and receipt identifier or combination of uniquely identifying data items for the receipt. In other embodiments, other single factors or combinations of factors may be used to make the determination 650.

Thus, one or more of the processes for determining: when to authorize a return, whether to provide a coupon, what coupon terms to offer, whether to provide a coupon holder, and what type of coupon holder to offer, may be highly customized to the business preferences of the merchant 120, if desired, and may be tailored to include factors deemed relevant and practical for the merchant's business.

Figure 7:
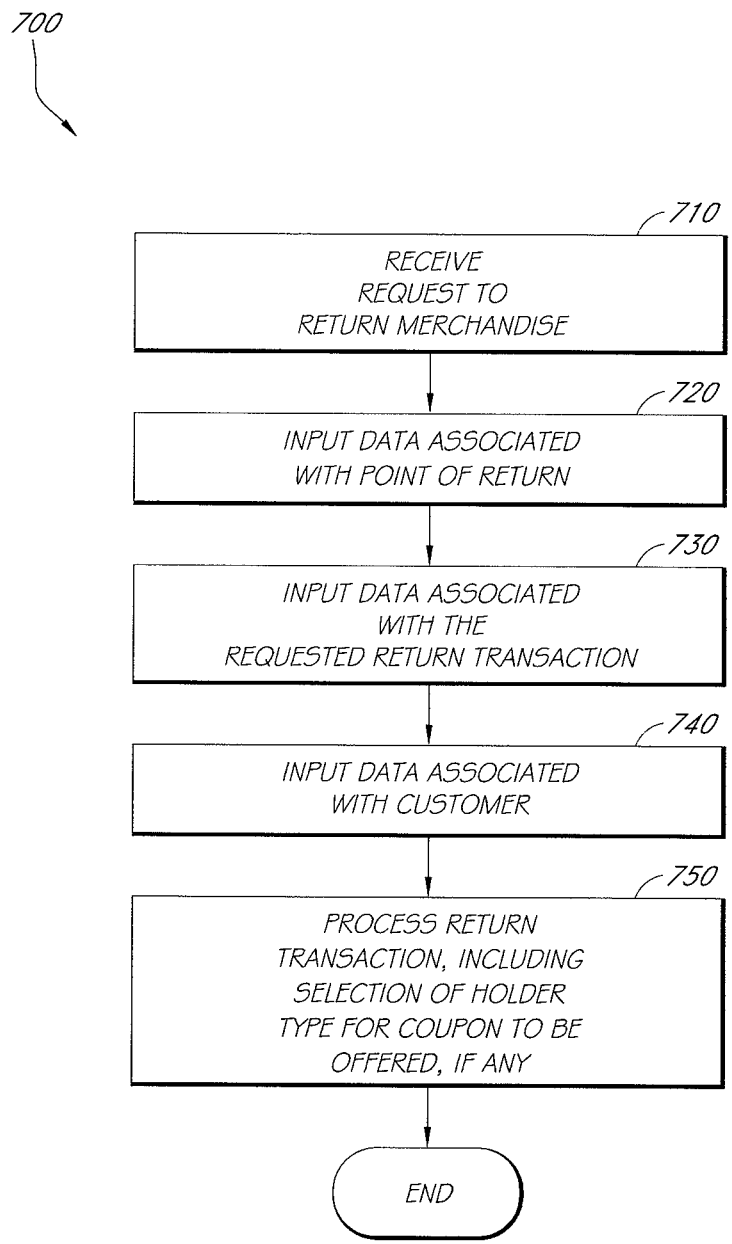
FIG. 7 is a flowchart that illustrates one embodiment of a process for collecting data at a point of return.

FIG. 7 is a flowchart that illustrates one embodiment of a process 700 for collecting data at a point of return 125 in connection with an automated and selective offering of the return coupon and the return coupon holder to a customer at a point of return 125. Specifics about types of data collected may depend, at least in part, on whether the coupon/coupon holder system is implemented in conjunction with a return authorization system, as well as on a level of analysis performed by the coupon-and-holder-related data collection process 700. Thus, the embodiment depicted in FIG. 7 is provided as an illustration and not to limit the scope of the coupon-and-holder-related data collection process 700.

The process 700 begins in Block 710 with the receipt of a request to accept a merchandise return. Moving on to Block 720, in one embodiment, a clerk at the point of return 125 inputs data associated with the point of return 125. For example, the clerk may be prompted, or may input without being prompted, an employee identifier that allows himself or herself to be identified as handling the requested return. In other embodiments, the clerk may also input a POR device 126 terminal number, and store location for use in the return authorization determination. Information about the POR device 126 terminal number and/or store location may additionally or alternatively be provided automatically by the POR device 126 and/or may be accessed from stored information associated with the POR device 126.

In Block 730, the clerk inputs data associated with the requested merchandise return transaction. The inputted information may include, but is not limited to, any of the following types of information: date and/or time of the requested return transaction; quantity, identifiers, prices, and/or types of the merchandise items being presented for return; presence or absence of receipt(s) for the merchandise being presented for return; and a type of return being requested (for example, exchange for merchandise, exchange for cash or other form of tender, partial exchange, etc.)

In Block 740, the clerk inputs data associated with the customer. For example, any of a wide variety of types of identification information about the customer may be inputted. In addition, information about the customer's interest in receiving a coupon (opting-in) and/or the customer's coupon preferences may be inputted.

As will be familiar to one of skill in the art, the above-mentioned types of information may be inputted using a wide variety of data-input method technologies associated with the POR device 126 and/or any of a variety of peripheral or associated devices. For example, the data may be input using one or more of: a keyboard, touch screen, stylus, microphone, camera, magnetic stripe scanner, bar code scanner, other electronic reader, biometric input device, or other appropriately configured devices.

In Block 750, the coupon determination associated with the requested merchandise return transaction is processed, including selection of a return coupon holder type for a coupon to be offered, if any, either together with an authorization determination for the requested return transaction, or not. In some embodiments, an indication of a determination regarding at least one of whether to offer a coupon and with what coupon terms, as well as whether to use a coupon holder and an indication of which to type to offer is provided to a clerk handling the return transaction. In some embodiments, a manager or other authorized merchant representative may override the determinations for any of a variety of authorized reasons and may, for example, provide a VIP return coupon holder to a customer to whom the determination recommends a lower category of coupon holder 100 or not providing a coupon holder and/or altering to some extent the coupon holder determination.

As will be familiar to one of skill in the art, other embodiments of the process 700 described in FIG. 7 may be carried out by executing the functions described in FIG. 7 in a different order, by dividing the functions in another manner, and/or by including some or all of the functions described above in conjunction with other associated functions.

Figure 8A:
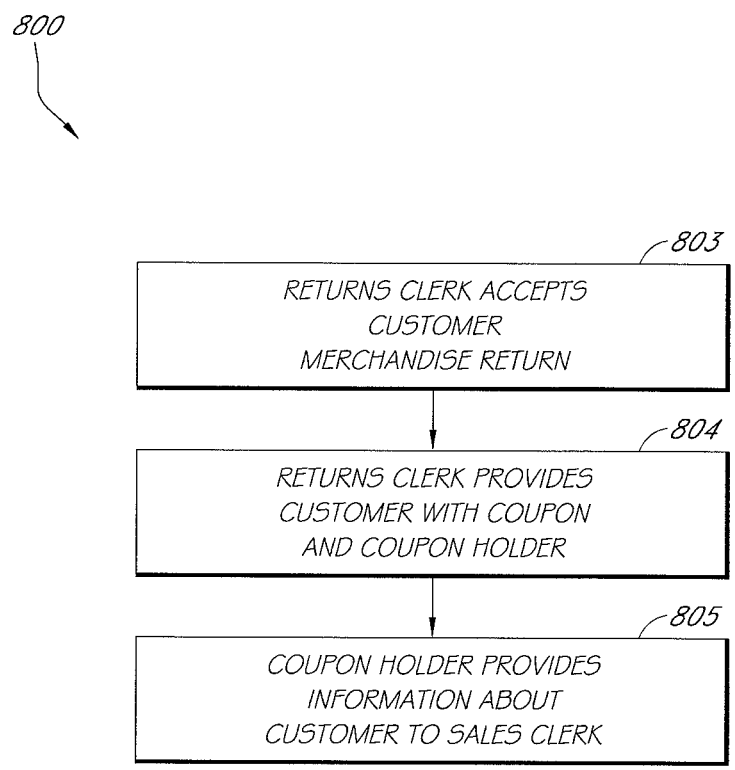
FIG. 8A is a flowchart that illustrates one embodiment of a process for providing and using a return coupon holder for a return coupon issued to a customer at a point of return.

FIG. 8A is a flowchart that illustrates one embodiment of a process 800 for providing and using a return coupon holder 100 for a return coupon 105 issued to a customer 110 at a point of return 125. In Block 803, a returns clerk accepts a customer merchandise return. In Block 804, the returns clerk provides the customer 110 with a return coupon 105 and a return coupon holder 100. In Block 805, as the customer 110 proceeds through the store after the return transaction, the coupon holder 100 provides information about the customer to a sales clerk who encounters the customer on his or her way through the store. As has been described above, the information provided by the return coupon holder 100 may be, for example, one or more of: an indication of the return dollar amount, an indication of how the return amount was provided to the customer, an indication of a department from which some or all of the return merchandise came, an indication of the profitability and/or quality of the customer, an indication of a calculated likelihood that the return is fraudulent or abusive, another type of indication, and/or a combination of two or more of the above.

Additionally or alternatively, one or more devices 106 in the return coupon sleeve 100 may provide information about, for example, where the customer passes on his or her way through the store, how long he or she stops in various locations, what merchandise the customer looked at, and/or what interactions the customer has with sales personnel on the way.

Figure 8B:
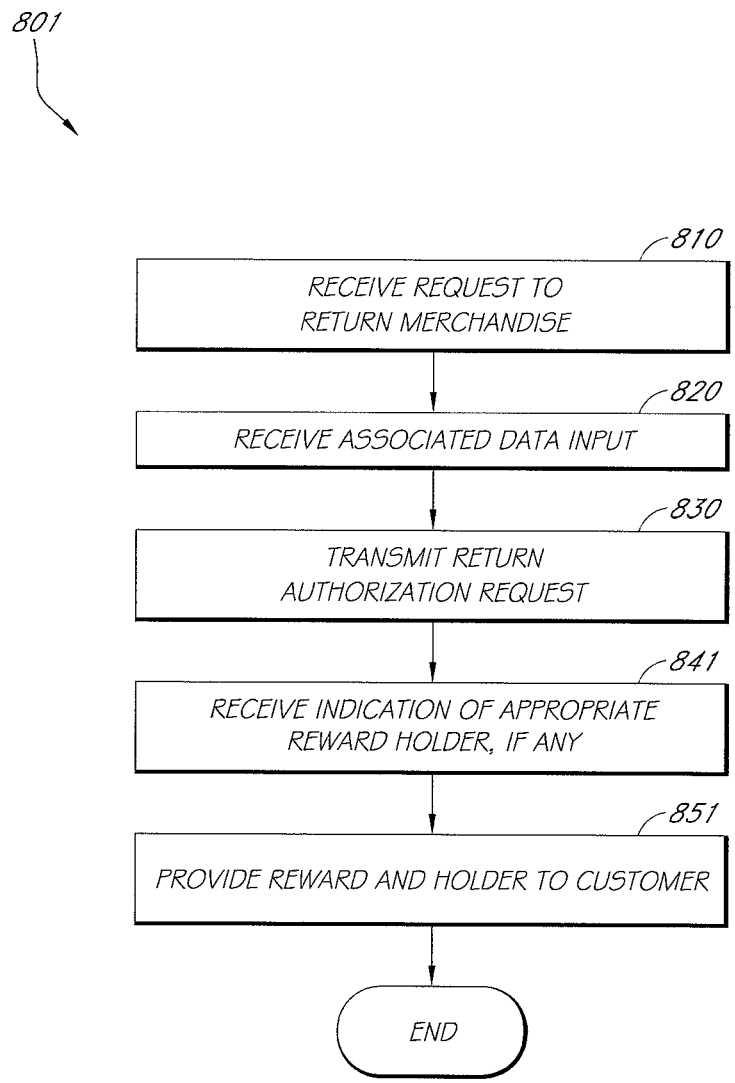
FIG. 8B is a flowchart that illustrates one embodiment of a process for submitting a return authorization request and for providing a return coupon holder for a return coupon issued to a customer at a point of return.

FIG. 8B is a flowchart that illustrates one embodiment of a process 801 for submitting a return authorization request and for providing a return coupon holder for a return coupon issued to a customer 110 at a point of return 126.

In Block 810, the process 801 begins when the point of return (POR) device 126 receives a request for a merchandise return transaction.

In Block 820, data used for processing the requested merchandise return transactions is entered into the POR device 126, which may be a dedicated device or may be a device that is used for other purposes, as well, such as a point of sale terminal.

In Block 830, the POR device 126 transmits the entered data to the reward authorization service 107 for use in processing of the coupon determination. In some embodiments, other store-related data 128 available to the reward authorization service 107 that may have been received through other channels may also be used.

In Block 841, the POR device 126 receives an indication of an appropriate reward holder, if one has been identified for the merchandise return transaction.

In Block 851, the POR device 126 prints, or otherwise presents to the customer 110, the selected coupon or other reward and holder. In some embodiments, where a point of sale terminal is being used as the POR device 126, the point of sale terminal may print the coupon and/or the coupon holder 100. In some embodiments, the coupon 105 is printed out, while the coupon holder 100 is selected from a store of coupon holders 100 readily available to the returns clerk. Furthermore, as will be familiar to one of skill in the art, other embodiments of the process 801 described in FIG. 8B may be carried out by executing the functions described in FIG. 8B in a different order, by dividing the functions in another manner, and/or by including some or all of the functions described above in conjunction with other associated functions.

Figure 9A:
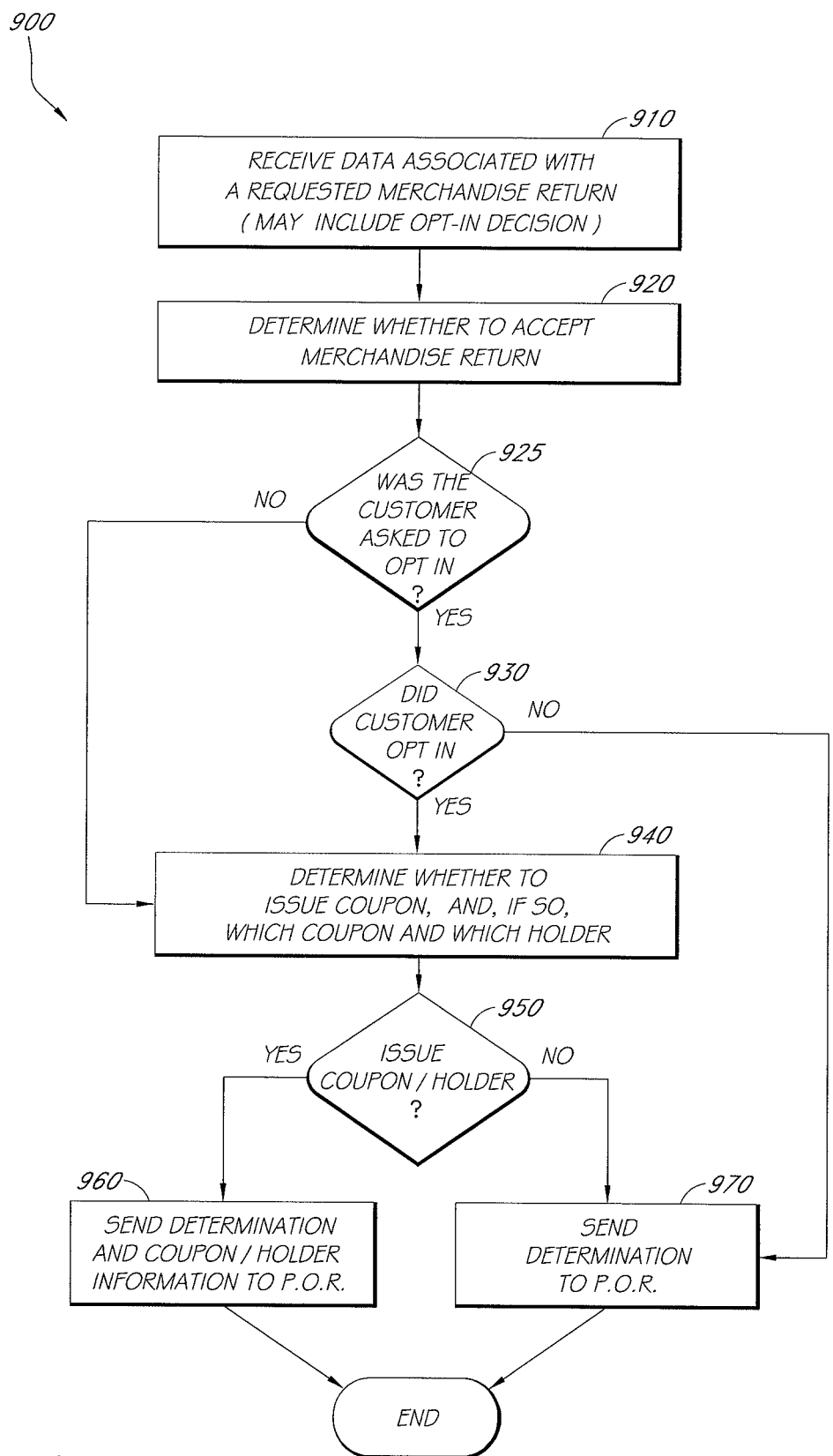
FIGS. 9A, 9B, and 9C are flowcharts that illustrate three embodiments of a process 900 for determining whether to provide a coupon and a coupon holder to a customer 110 at a point of return 125, and, if so, which coupon and which coupon holder to offer.
Figure 9B:
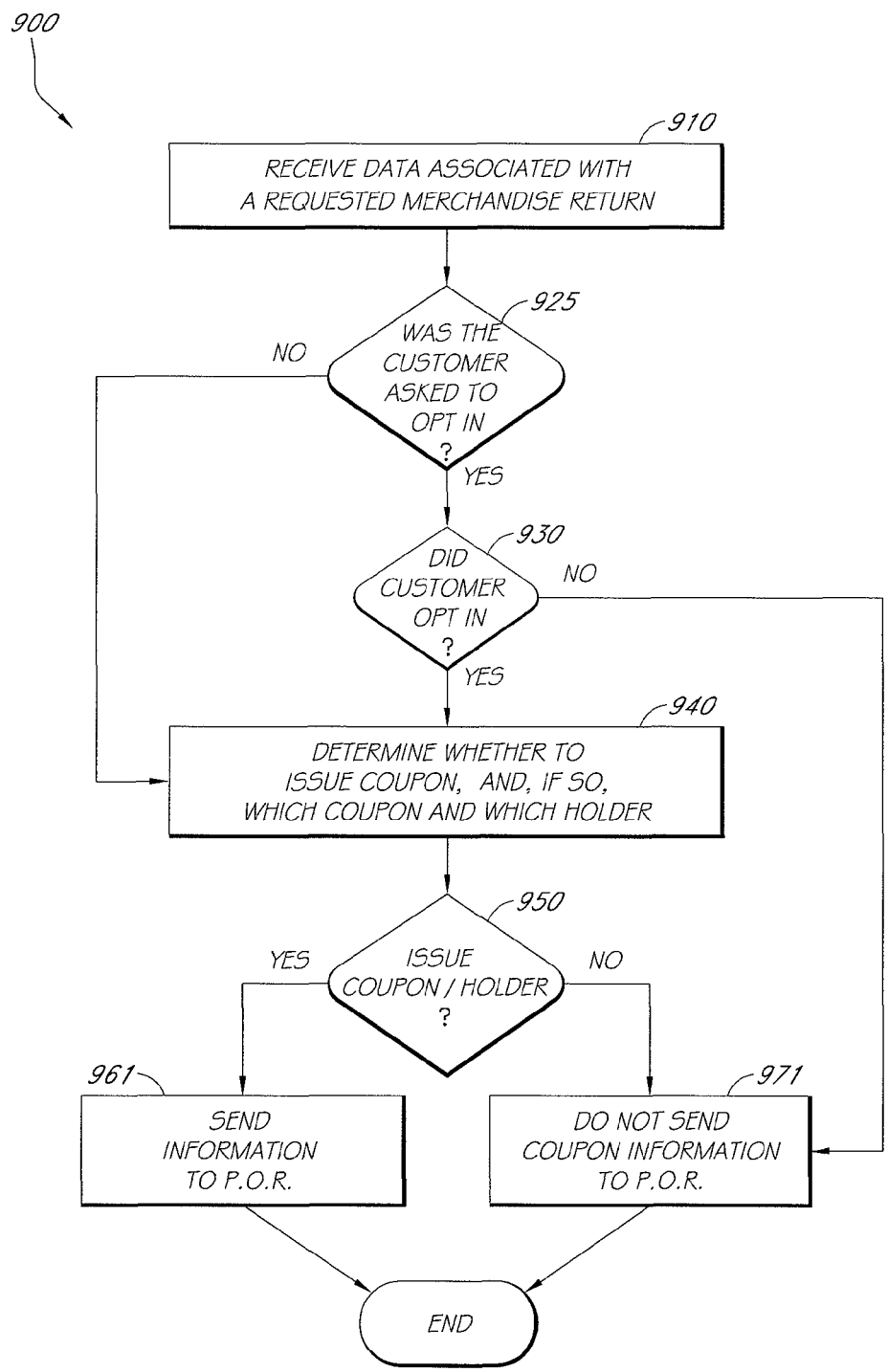
Figure 9C:
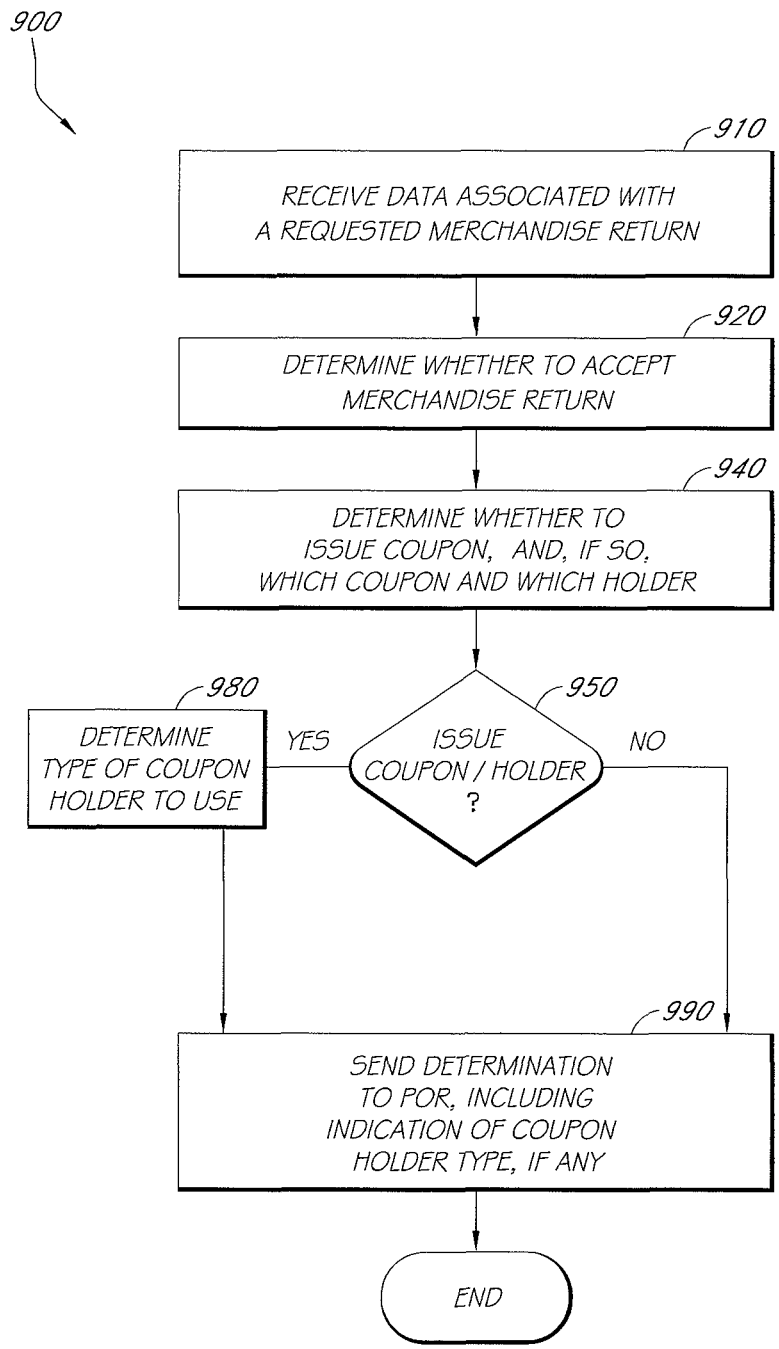

FIGS. 9A, 9B, and 9C are flowcharts that illustrate three embodiments of a process 900 for determining whether to provide a coupon and a coupon holder to a customer 110 at a point of return 125, and, if so, which coupon and which coupon holder to offer. The embodiment of the process 900 as described with respect to FIG. 9A makes the coupon-and-holder-related determinations in association with a return authorization determination. The embodiment of the process 900 as described with respect to FIG. 9B makes the coupon-and-holder-related determinations without being associated with a return authorization determination. In both FIGS. 9A and 9B, the process 900 is described as including an opportunity for the customer to "opt-in" to receive a coupon. However, as has been described above, in various embodiments, an "opting-in" aspect of the coupon-and-holder-related system may be optional; other embodiments of the process 900 may be implemented without inclusion of an "opting-in" step on the part of the customer. For example, FIG. 9C is a flowchart that describes an embodiment of the process 900 without inclusion of an "opt-in" on the part of the customer 110.

Describing now the embodiment of the process 900 as depicted in FIG. 9A, in Block 910, the merchandise return and reward authorization service 107 receives data associated with a requested merchandise return.

In Block 920, the merchandise return and reward authorization service 107 determines whether to recommend accepting the requested merchandise return. In particular, the merchandise return and reward authorization service 107 assesses the risk of authorizing the requested return transaction based, at least in part, on the received data, as well as on stored data that may include information about merchant return policies 150, information associated with the customer's past purchase and/or return transactions, information about the clerk, and any of a wide variety of other types of information. Thus, the return transaction determination may indicate that the requested return should be accepted or denied. The process 900 then passes to Block 925.

In Block 925, the process 900 determines whether the customer has been asked to opt-in to receive a coupon. If the customer has not been asked to opt-in, such as, for example, when opting-in to a reward program is not available or is not always implemented, the process 900 moves on to Block 940, and proceed as will be described below with reference to Block 940.

If, in Block 925, the process 900 determines that the customer has been about opting-in to a reward program, the process 900 moves on to Block 930.

In Block 930, the process 900 determines whether the customer has opted-in and is interested in receiving a coupon.

If, in Block 930, the process 900 determines that the customer is not interested in opting-in to receive a coupon, the process 900 passes to Block 970, where the merchandise return and reward authorization service 107 sends an indication of the return transaction determination, whether it is a rejection or an acceptance, to the POR device 126, and the process 900 ends.

If, instead, in Block 930, the process 900 determines that the customer does wish to receive a coupon, the process 900 passes to Block 940, where the merchandise return and reward authorization service 107, in conjunction with the reward qualifier and holder selector 153, determines whether to issue a coupon, and if so, which coupon and which coupon holder, if any. For example, the process might determine, based on customer product preference information, that a small percentage discount for a general type of product that the customer has frequently purchased in the past may be sufficient incentive for the customer to make another purchase of that product type. As another example, the process might determine that the customer frequently returns apparel and that a coupon for the housewares department might more likely result in a sale of merchandise that is not later returned. As a further example, the process might determine that a currently ongoing promotional sale for swimwear is not generating the sales expected and that providing in-store customers with an additional discount for swimwear might boost sales of swimwear. These examples are provided to illustrate the fact that implementation of the reward-related determinations may be customized to a high degree, if desired, to take customer preferences and/or merchant preferences into consideration.

Furthermore, the return coupon selection determination 650, an embodiment of which was described with reference to FIG. 6, may determine which coupon holder to provide or whether any coupon holder is to be provided. The return coupon selection determination 650 may be dependent, in full or in part, on the reward-related determinations, or the return coupon selection determination 650 may be carried out independently from the determinations of whether to provide a return coupon or other reward, and, if so, which coupon to provide.

From Block 940, the process 900 passes to Block 950 where, if the merchandise return and reward authorization service 107 determines to provide a coupon and holder together with the merchandise return transaction determination, process 900 passes to Block 960 and the merchandise return and reward authorization service 107 sends to the POR device 126 the merchandise transaction determination along with instructions regarding a coupon and coupon holder for presenting to the customer 110, after which the process 900 ends.

If, in Block 950, the merchandise return and reward authorization service 107 determines not to provide a coupon together with the merchandise return transaction determination, the process 900 passes to Block 970 and the merchandise return and reward authorization service 107 sends to the POR device 126 the merchandise return transaction determination without a coupon or a coupon holder. And the process 900 ends.

Describing now the embodiment of the process 900 as depicted in FIG. 9B, in which coupon determination is not associated with a return authorization determination, in Block 910, the reward authorization service 107 receives data associated with a requested merchandise return and then passes to Block 925.

In Block 925, the process 900 determines whether the customer has been asked to opt-in to receive a coupon. If the customer has not been asked to opt-in, such as, for example, when opting-in to a reward program is not available or is not always implemented, the process 900 moves on to Block 940, and proceed as will be described below with reference to Block 940.

If, in Block 925, the process 900 determines that the customer has been about opting-in to a reward program, the process 900 moves on to Block 930.

The process passes to Block 930, where the process 900 determines whether the customer opted-in and is interested in receiving a coupon.

If, in Block 930, the process 900 determines that the customer is not interested in opting-in to receive a coupon, the process 900 passes to Block 970, where the reward authorization service 107 does not send a coupon to the POR device 126, and the process 900 ends.

If, instead, in Block 930, the process 900 determines that the customer does wish to receive a coupon, or has not been asked to opt-in, the process 900 passes to Block 940, where the reward authorization service 107, in conjunction with the reward qualifier and holder selector 153, determines whether to issue a coupon and a coupon holder, and if so, which coupon and which coupon holder. As has been described, with reference to FIG. 9A and elsewhere in the disclosure, implementation of the coupon-and-holder-related determinations 650 may be customized to a high degree, if desired, to take customer preferences and/or merchant preferences into consideration.

From Block 940, the process 900 passes to Block 950 where, if the reward authorization service 107 determines to provide a coupon and a holder, process 900 passes to Block 961 and the reward authorization service 107 sends to the POR device 126 a coupon, or instructions for accessing a coupon and a holder, for presenting to the customer 110, after which the process 900 ends.

If, in Block 950, the reward authorization service 107 determines not to provide a coupon, the process 900 passes to Block 971 and the reward authorization service 107 does not send a coupon to the POR device 126 nor is any coupon holder offered to the customer.

Describing now the embodiment of the process 900 as depicted in FIG. 9C, in which coupon and coupon holder determinations are associated with a return authorization determination, but not with an opt-in process in Block 910, the reward authorization service 107 receives data associated with a requested merchandise return and then passes to Block 920.

In Block 920, the merchandise return and reward authorization service 107 determines whether to recommend accepting the requested merchandise return. In particular, the merchandise return and reward authorization service 107 assesses the risk of authorizing the requested return transaction based, at least in part, on the received data, as well as on stored data that may include information about merchant return policies 150, information associated with the customer's past purchase and/or return transactions, information about the clerk, and any of a wide variety of other types of information. Thus, the return transaction determination may indicate that the requested return should be accepted or denied. The process 900 then passes to Block 940.

In Block 940, the reward authorization service 107, in conjunction with the reward qualifier and holder selector 153, determines whether to issue a coupon and a coupon holder, and if so, which coupon and which coupon holder. As has been described, with reference to FIG. 9A and elsewhere in the disclosure, implementation of the coupon-and-holder-related determinations 650 may be customized to a high degree, if desired, to take customer preferences and/or merchant preferences into consideration.

From Block 940, the process 900 passes to Block 950 where, if the reward authorization service 107 determines not to provide a coupon, the process 900 passes to Block 990 and the reward authorization service 107 sends a determination regarding the return to the point of return 125, including an indication that the reward authorization service 107 has determined not to provide a coupon or a return coupon holder to the customer in association with the current return transaction.

If, in Block 950, the reward authorization service 107 determines to provide a coupon and a holder, process 900 passes to Block 980, where a determination is made as to the type of return coupon holder to provide to the customer. The process 900 next passes to Block 990, where the reward authorization service 107 sends a determination regarding the return to the point of return 125, including a return coupon, or instructions for accessing or generating a return coupon and a return coupon holder, for presenting to the customer 110, after which the process 900 ends.

As will be familiar to one of skill in the art, other embodiments of the process 900 described in FIGS. 9A, 9B, and 9C may be carried out by executing the functions described in FIGS. 9A, 9B, and 9C in a different order, by dividing the functions in another manner, and/or by including some or all of the functions described above in conjunction with other associated functions. For example, in some embodiments, the customer may be offered an opportunity to "opt-in" to receive coupons on a first requested return transaction, but, if the customer accepts, the customer may be assumed to continue to desire coupons on subsequent requested return transactions and may not be asked to "opt-in" again. Other variations with regard to opting-in may also be included in the systems and methods described herein. As another example, when authorization for a requested return transaction is denied, the system may determine that offering a coupon may serve as a "consolation prize" for the customer, attempting to make amends and generate customer loyalty for the store. In such cases, for example, determination of whether to offer a return coupon holder, as well selection of a coupon holder type may be implemented as described above, or, in the alternative, may proceed directly to indicate a special type of coupon holder used for such situations or to indicate provision of a return coupon, but with no coupon holder at all.

In other embodiments, the clerk, or the system, may issue a coupon to a customer to encourage the customer to keep the merchandise presented for return. This would bypass return authorization, if it is present in the embodiment, and go directly to coupon issuance. Also, a customer might be offered and instant discount for not returning (i.e., a discount applied to the price the customer already paid for the merchandise item.) In another embodiment, a customer might be offered both an instant discount and a coupon for another purchase if the customer decides not to return.

In some embodiments, the customer may be presented with a choice of terms of a coupon or other reward that may be offered. In some embodiments, the choice is offered on a computer screen or other digital display device, such as a touch screen device at a coupon kiosk that allow the customer to select among options before the reward is printed or otherwise presented to the customer.

In some embodiments, the clerk may be authorized to override a decision not to issue a coupon and may force the system to issue one. Furthermore, in some embodiments, the coupon may not be presented to the customer at the point of return, but may instead be mailed to the customer's home to encourage the customer to shop at the store on another occasion or may be otherwise presented to the customer.

In conjunction with any one or more the above-described alternate embodiments, a determination may be made whether to provide a return coupon holder 100 and/or to select a preferred type of return coupon holder 100 to offer to the customer 110.

Figure 10:
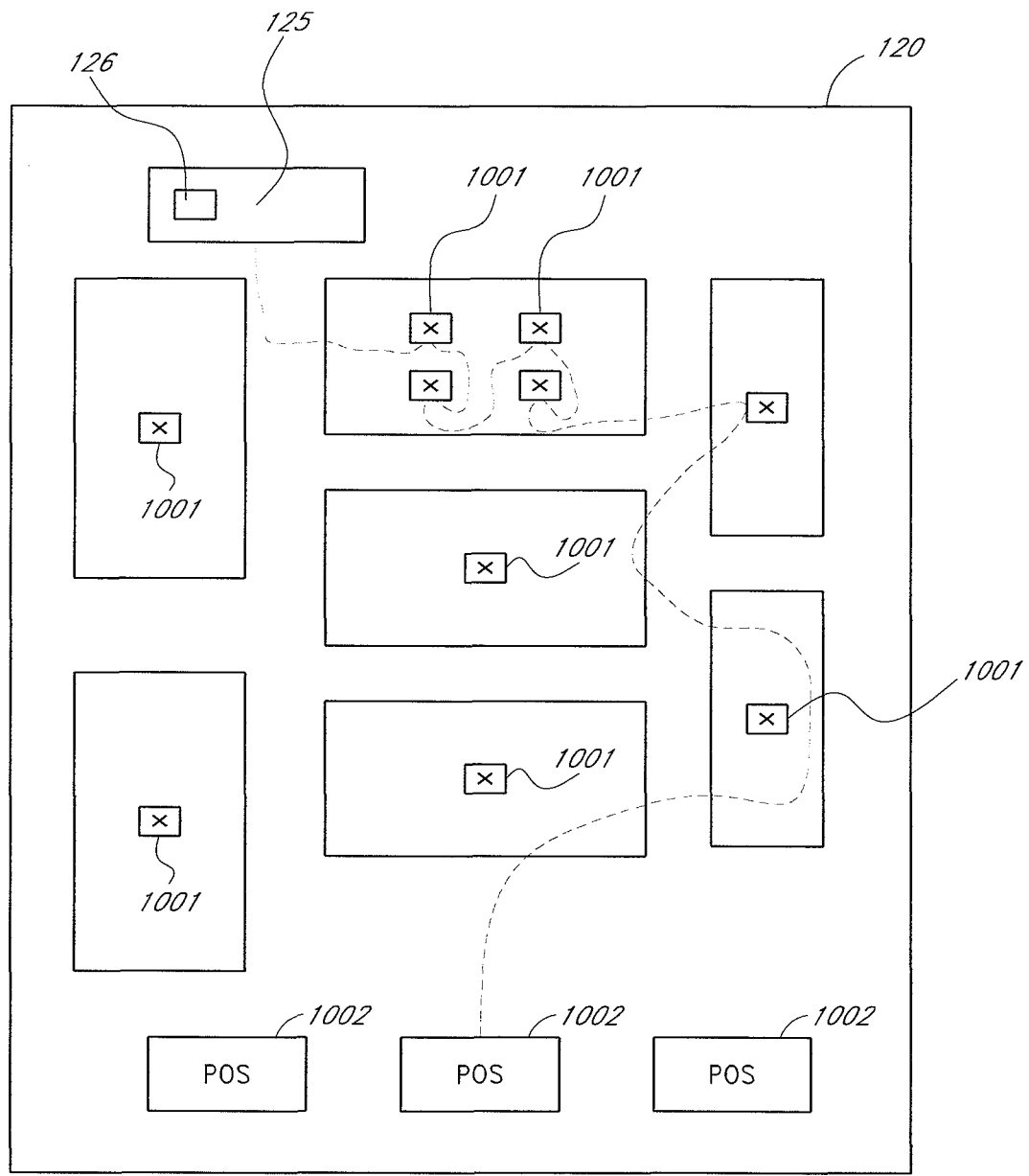
FIG. 10 is a block diagram of a store floor plan that illustrates one embodiment of the use of a return coupon holder that is equipped with an RFID device or other customer tracking device.

FIG. 10 is a block diagram of a store 120 floor plan that illustrates one embodiment of the use of a return coupon holder 100 that is equipped with an RFID device 106 or other customer tracking device. As can be seen in FIG. 10, three point of sale terminals 1002 are typically located at a front portion of the store 120, which appears toward the bottom of FIG. 10. Under this orientation, the store's point of return 125 and the point of return device 126 are located at a rear portion of the store 120 floor plan. A dashed line indicates a pathway that a customer who has completed a return transaction takes on the way out of the store. The various rectangles indicate departments or sections of merchandise displays throughout the store 120. FIG. 10 also depicts several RFID sensors 1001 or other tracking system devices positioned in various locations throughout the sections of merchandise displays of the store floor plan 120. If the customer 110 has been provided with a return coupon holder 100 that includes an appropriate RFID or other tracking system device 106, then the store's RFID sensors 1001 will be able to provide information about the customer's movements through the store. In some embodiments, the sensors 1001 may be configured to alert a sales clerk in the vicinity that a customer who has just completed a return transaction, and, in some embodiments, who belongs to a known customer category, is passing or browsing nearby. In some embodiments, the sensors 1001 additionally or alternatively collect and store information about the customer's movements and activities for later use by the merchant and/or by other affiliated entities.

FIG. 11 is a flowchart that illustrates one embodiment of a process 1100 for issuing and using a trackable return coupon holder 100.

Beginning in Block 1111, a merchant provides a customer with a return coupon 105 with a trackable return coupon holder 100 that has a tracking device 106, such as an RFID device. In Block 1112, the tracking device 106, in conjunction with one or more other devices in the merchant's store, tracks the customer's activities for the remainder of the merchant visit. In Block 1113, data about the customer's tracked movements are stored for later use and possible analysis by the merchant and/or by another party with access to the data.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A computerized system for providing a return coupon and a return coupon holder to a customer making a merchandise return at a merchant's store, the system comprising:

a plurality of return coupon holders, each return coupon holder comprising a radio frequency identifier (RFID) that references electronic information regarding a merchandise return transaction, the plurality of return coupon holders further configured to hold a return coupon, wherein the return coupon is separate from the return coupon holder, and wherein the return coupon is placed into and held within the return coupon holder, both the return coupon and the return coupon holder associated with the merchandise return transaction made by a customer at a merchant's store at a point of return, wherein the return coupon is placed into the return coupon holder at the point of return, wherein the plurality of return coupon holders comprise different types, wherein a first type of return coupon holder comprising the RFID is configured to indicate a merchandise department in the merchant's store associated with one or more of the returned items, wherein a second type of return coupon holder comprising the RFID is configured to indicate a monetary value of one or more of the items returned by the customer, and wherein a third type of return coupon holder comprising the RFID is configured to indicate a duration of the return coupon held by the return coupon holder;

a processor configured to receive information about the merchandise return, wherein the merchandise return comprises one or more items that the customer desires to return to the merchant; and a return coupon holder decision engine executing in one or more computer processors, in communication with the processor and with the database, wherein the return coupon holder decision engine is configured to receive the information about the merchandise return by the customer, wherein the return coupon holder decision engine determines that a coupon holder should not be given to the customer at the point of return, when the return holder decision engine determines, based at least in part on information about the merchandise return, that the monetary amount of the merchandise return falls below a threshold;

wherein the return coupon holder decision engine selects the first type of coupon holder for the customer at the point of return when the return coupon holder decision engine determines, based at least in part on information about the merchandise return, that the items returned by the customer are associated with a merchandise department in the merchant's store, wherein the electronic device associated with the first type of return coupon holder is configured to play an audio recording at a location in the merchant's store based on type of items returned by the customer; and wherein the return coupon holder decision engine selects the second type of coupon holder for the customer at the point of return when the return coupon holder decision engine determines, based at least in part on the information about the merchandise return, that the monetary amount of the items returned by the customer exceeds a threshold, wherein the electronic device associated with the second type of return coupon holder is configured to play an audio recording at a location in the merchant's store based on similarity of price to the items returned by the customer, wherein the return coupon holder decision engine selects the third type of coupon holder for the customer at the point of return based at least in part on the duration of the return coupon associated with the return items a sensor that senses the RFID in the first type, second type or third type of coupon holder and alerts a sales clerk in the vicinity of the sensor that a merchandise return transaction has been completed.

2. The computerized system of claim 1, wherein the combination of the return coupon holder and the return coupon conveys information regarding the merchandise return transaction to a representative of the merchant.

3. The computerized system of claim 2, wherein the information regarding the merchandise return transaction includes an indication that the customer made the merchandise return transaction and that the customer has been issued a return coupon.

4. The computerized system of claim 2, wherein the information regarding the merchandise return transaction comprises an indication of a dollar amount of the return transaction.

5. The computerized system of claim 2, wherein information regarding the merchandise return transaction comprises information about one or more types of merchandise items returned by the customer.

6. The computerized system of claim 5, wherein the information about the one or more types of merchandise items includes at least one of the set consisting of: a department associated with one or more of the merchandise items, a brand name associated with one or more of the merchandise items, and one or more SKU codes associated with one or more merchandise items.

7. The computerized system of claim 2, wherein the return coupon holder conveys the information in a non-textual manner.

8. The computerized system of claim 7, wherein the information is conveyed visually.

9. The computerized system of claim 8, wherein the information is conveyed by at least one of the set consisting of: a size of the return coupon holder, a color of the return coupon holder, a shape of the return coupon holder, a graphic design on the return coupon holder, text or other typographic symbols on the return coupon holder, and a material from which the return coupon holder is made.

10. The computerized system of claim 8, wherein the information is conveyed by a portion of the return coupon that is visible when the return coupon holder is holding the return coupon.

11. The computerized system of claim 10, wherein the portion of the return coupon that is visible when the return coupon holder is holding the return coupon is visible through a window in the return coupon holder.

12. The computerized system of claim 7, wherein the electronic device is embedded in the return coupon holder.

13. The computerized system of claim 12, wherein the electronic device is at least one of the set consisting of: an RFID device, an electromagnetic device, and a global positioning system (GPS) device.

14. The computerized system of claim 12, wherein the electronic device is in communication with at least one device in the merchant's store.

* * * * *

UNITED STATES PATENT AND TRADEMARK OFFICE
CERTIFICATE OF CORRECTION

PATENT NO.        : 8,694,364 B2                                            Page 1 of 1
APPLICATION NO.   : 11/844286
DATED             : April 8, 2014
INVENTOR(S)       : Mark S. Hammond It is certified that error appears in the above-identified patent and that said Letters Patent is hereby corrected as shown below:

On title page 1 (item 56), in column 2, line 11, References Cited under Other Publications, change "Quatity" to --Quantity--.

In the Drawings,

In sheet 6 of 16, line 2 (reference numeral 410), change "Millitary" to --Military--.

In the Claims,

Column 36, lines 40-41, in Claim 13, after "of:", delete "an RFID device,".

Signed and Sealed this
Sixteenth Day of December, 2014

Michelle K. Lee
*Deputy Director of the United States Patent and Trademark Office*